(12) United States Patent  
Sato et al.

(10) Patent No.: US 6,460,918 B1
(45) Date of Patent: Oct. 8, 2002

(54) VEHICLE BODY STRUCTURE

(75) Inventors: Manabu Sato, Yokohama; Tatsuya Fukushima, Kanagawa, both of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/688,930

(22) Filed: Oct. 17, 2000

(30) Foreign Application Priority Data

Oct. 19, 1999 (JP) .......................................... 11-297413
Oct. 19, 1999 (JP) .......................................... 11-297438

(51) Int. Cl.$^7$ ............................................. B60R 27/00
(52) U.S. Cl. ................. 296/204; 296/203.04; 296/187; 296/189; 296/30
(58) Field of Search ........................ 296/204, 203.02, 296/187, 188, 189, 29, 30

(56) References Cited

U.S. PATENT DOCUMENTS

| | | | | |
|---|---|---|---|---|
| 3,765,715 A | * | 10/1973 | Franchini | 296/188 |
| 4,457,555 A | * | 7/1984 | Draper | 296/203 X |
| 5,002,333 A | * | 3/1991 | Kenmochi et al. | 296/204 |
| 5,476,303 A | * | 12/1995 | Sakamoto et al. | 296/204 |
| 5,806,918 A | * | 9/1998 | Kanazawa | 296/204 |
| 5,882,065 A | * | 3/1999 | Koiwa et al. | 296/203.02 |
| 5,921,618 A | * | 7/1999 | Mori et al. | 296/188 |
| 6,203,099 B1 | * | 3/2001 | Iwatsuki | 296/204 |
| 6,206,461 B1 | * | 3/2001 | Gaiser | 296/204 |
| 6,227,610 B1 | * | 5/2001 | Iwatsuki et al. | 296/204 |
| 6,270,151 B1 | * | 7/2001 | Sato | 296/203.02 |
| 6,270,152 B1 | * | 7/2001 | Sato | 296/203.02 |
| 6,270,153 B1 | * | 7/2001 | Toyao et al. | 296/204 |

FOREIGN PATENT DOCUMENTS

| | | |
|---|---|---|
| DE | 42 44 471 | 6/1994 |
| DE | 43 35 501 | 4/1995 |
| DE | 197 24 557 | 12/1998 |
| DE | 097 22 344 | 4/1999 |
| FR | 2 746 481 | 9/1997 |
| JP | 09 099870 | 4/1997 |

\* cited by examiner

Primary Examiner—Stephen T. Gordon
Assistant Examiner—Lori L Coletta
(74) Attorney, Agent, or Firm—McDermott, Will & Emery

(57) ABSTRACT

A vehicle body structure comprise a cross member and a floor. Two parallel side members extend along a longitudinal central line of a vehicle and outwardly from the cross member. The cross member is formed by extrusion in a first direction lying in parallel to a transverse line crossing the longitudinal central line. The floor is formed by extrusion in a second direction lying in parallel to the longitudinal central line. The floor includes a recess recessed inwardly and a floor panel portion that defines at least a portion of the recess defining edge. The cross member has an integral tooth fitted into the recess and connected to said floor along the recess defining edge.

45 Claims, 25 Drawing Sheets

[BMD]

= FIG.7(B-1)

$\begin{bmatrix} \text{MAGNITUDE} \\ \text{OF MOMENT} \end{bmatrix}$
$|M|$

= FIG.7(B-2)

$|\sigma| = \dfrac{|M|}{Z}$ $D \fallingdotseq 0$

VEHICLE BODY STRUCTURE

BACKGROUND OF THE INVENTION

1. Field of the Invention

The present invention relates to a vehicle body structure and, more particularly, to a vehicle body structure having decreased weight and increased strength.

2. Description of Related Art

JP-A 9-99870 discloses a vehicle floor constructed of a plurality of aluminum alloy extruded parts that have been extruded in a direction parallel to a longitudinal central line of a vehicle. In JP '870, hollow extruded materials are arranged in the longitudinal direction of a body and welded together to form the floor section 1 of the body frame of an automobile. The extruded materials are molded with two kinds of dies so that the extruded materials have symmetrical cross sectional shapes respectively They are inverted and symmetrically arranged across another extruded material and are welded to form a floor section 1. The types of the extruded materials can be decreased, molding and machining facilities can be miniaturized, and the manufacturing cost can be reduced.

SUMMARY OF THE INVENTION

There is a need for a vehicle body structure having a reduced stress discontinuity at a point where the structural members are connected.

There is also a need for a vehicle body structure in which a moment arm caused by deformation of the dash panel is reduced.

There is a further need for a vehicle body structure having increased strength with decreased weight.

These and other needs are satisfied by an embodiment of the invention, which provides a vehicle body structure for a vehicle having a longitudinal centerline and a transverse line that crosses the longitudinal centerline. The vehicle body structure comprises an extruded cross member having at least one tooth and an extruded floor. The extruded floor is comprised of a plurality of structural members having ends that contact the cross member. The extruded floor is also comprised of at least one floor panel portion disposed between adjacent ones of the plurality of structural members. Each of the floor panel portions has an edge that is at least partially recessed from the ends of the adjacent structural members to form a recess. Each recess receives a corresponding one of the at least one tooth.

Additional advantages and novel features of the invention will be set forth, in part, in the following description, and, in part, will be apparent to those skilled in the art after examining the following or by practicing the invention. The advantages of the invention may be realized and attained via the instrumentalities and combinations particularly pointed out in the appended claims.

BRIEF DESCRIPTION OF THE DRAWINGS

Preferred embodiments of the invention will be described with reference to the attached drawings, which are incorporated in and constitute a part of the specification, in which.

DESCRIPTION OF THE PREFERRED EMBODIMENTS

Figure 1:
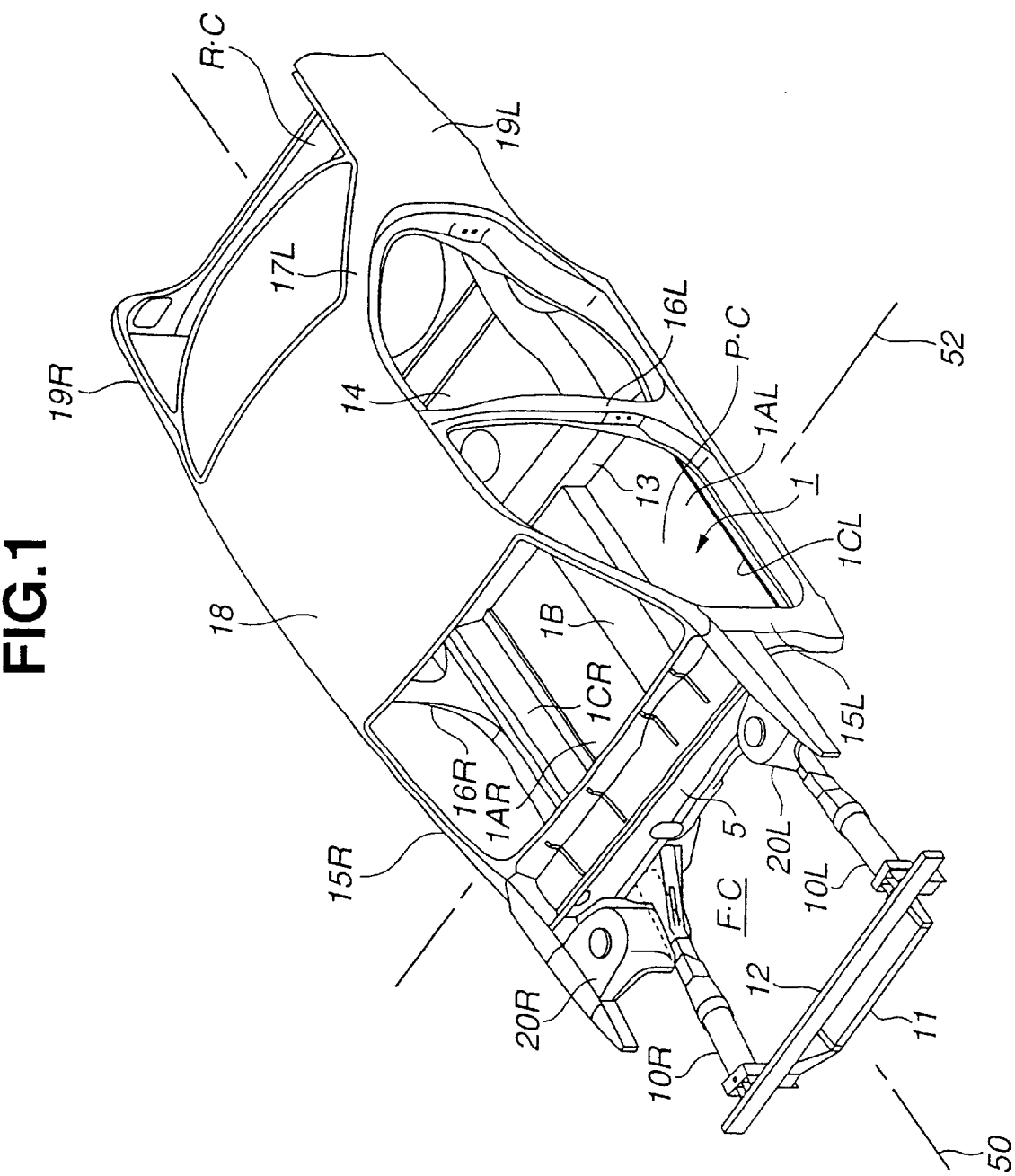
FIG. 1 is a fragmentary perspective view of a vehicle implementing the present invention.

Referring now to the drawings, and initially to FIG. 1, there will be seen a vehicle superstructure or a vehicle body structure having a cabin or passenger compartment P•C, a front compartment F•C, and a rear compartment R•C. In each of the embodiments of the present invention, the invention is implemented in a forward portion of the vehicle, which includes a cross member or dash cross member and a floor. The present invention is equally applicable to a rearward portion of the vehicle, which includes a cross member or rear cross member and a floor.

Figure 2:
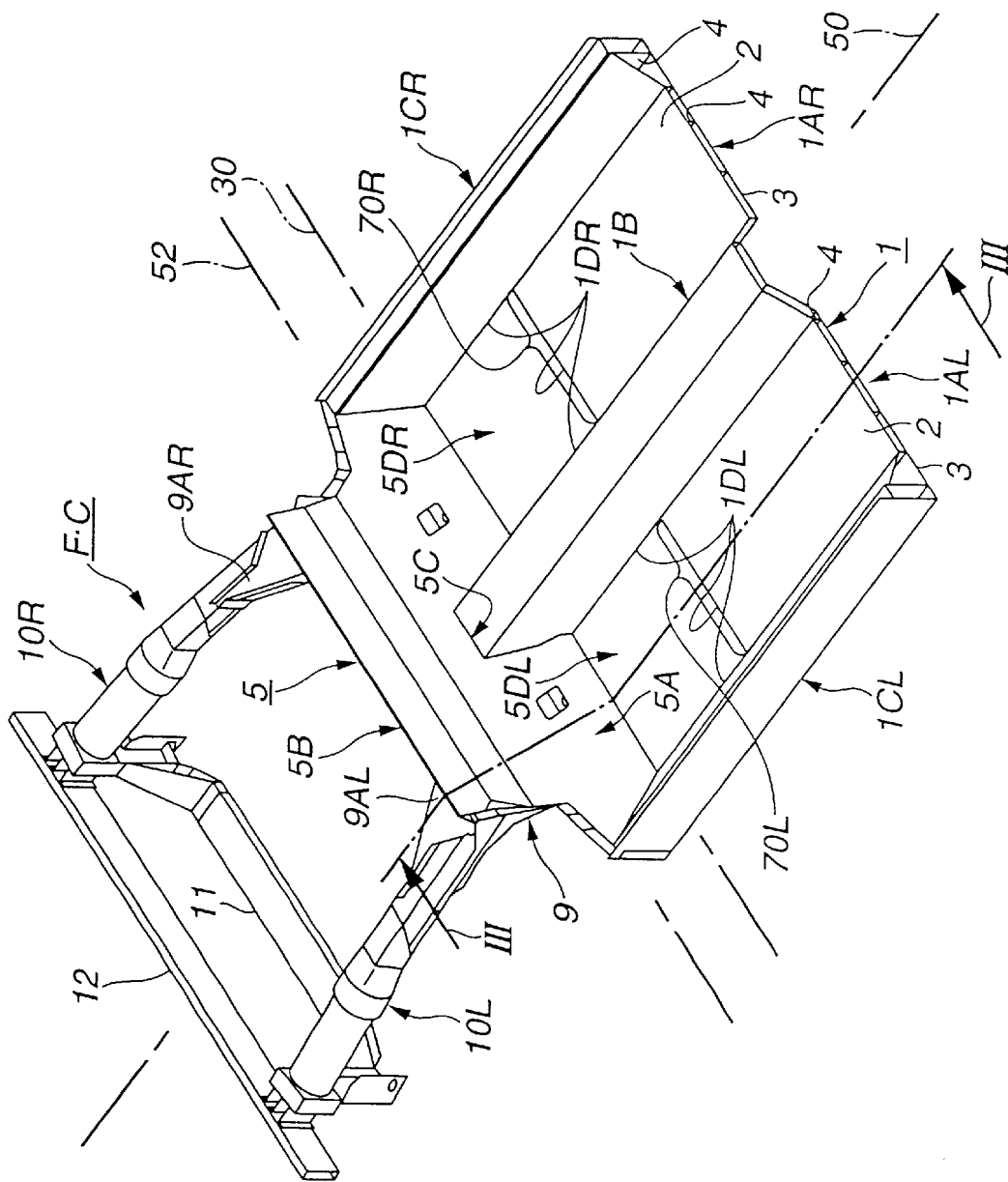
FIG. 2 is a fragmentary perspective view of a vehicle body structure according to a first embodiment of the invention.

A first embodiment of the invention will be described with reference to FIGS. 1 through 6. Referring to FIGS. 1 and 2, the vehicle has a longitudinal central line 50 and a transverse line 52, which intersects the longitudinal central line 50 at a substantially right angle. The vehicle body structure comprises a floor 1 and a dash cross member 5. The floor 1 extends rearward from the dash cross member 5 substantially parallel to the longitudinal central line 50. At its rear end, the floor 1 is connected to a rear seat cross member 13. Connected to and extending rearward from the rear seat cross member 5 is a rear floor panel 14.

The vehicle includes a left-hand front pillar 15L, a left-hand center pillar 16L, a left-hand rear pillar 17L, a left-hand rear fender 19L, a right-hand front pillar 15R, a right-hand center pillar 16R, a right-hand rear pillar (not shown) a right-hand rear fender 19R, and a roof panel 18. In the usual manner, the dash cross member 5, the floor 1, the front pillars 15L and 15R, the center pillars 16L and 16R, the rear pillars 17L, the rear seat cross member 13, the rear floor panel 14, and the roof panel 18 at least partially define the passenger compartment P•C.

The floor 1 is formed by extruding a light metal material, such as an aluminum alloy, in a first direction, which is substantially parallel to the longitudinal central line 50. As best seen in FIG. 2, the floor 1 has two spaced walls, namely an upper wall 2 and a lower wall 3, and partitions or reinforcement walls 4 between the upper and lower walls 2 and 3. The partitions 4 and the upper and lower walls 2 and 3 cooperate with each other to define, between the two walls 2 and 3, a plurality of parallel channels extending substantially parallel to the longitudinal central line 50. The partitions 4 enhance the structural rigidity of the floor 1.

The floor 1 includes at least portions of a plurality of floor structural members, which extend rearward from the dash cross member 5 substantially parallel to the longitudinal central line 50. The plurality of structural members include a central tunnel 1B and a first or left-hand side sill 1CL that is spaced from the tunnel 1B in a first or leftward direction, which is substantially parallel to the transverse line 52. The plurality of structural members further includes a second or right-hand side sill 1CR that is spaced from the tunnel 1B in a second or rightward direction, which is substantially parallel to the transverse line 52. The floor 1 includes a first or left-hand floor panel portion 1AL that extends between the tunnel 1B and the first side sill 1CL, and a second or right-hand floor panel portion 1AR that extends between the tunnel 1B and the second side sill 1CR.

Figure 3:
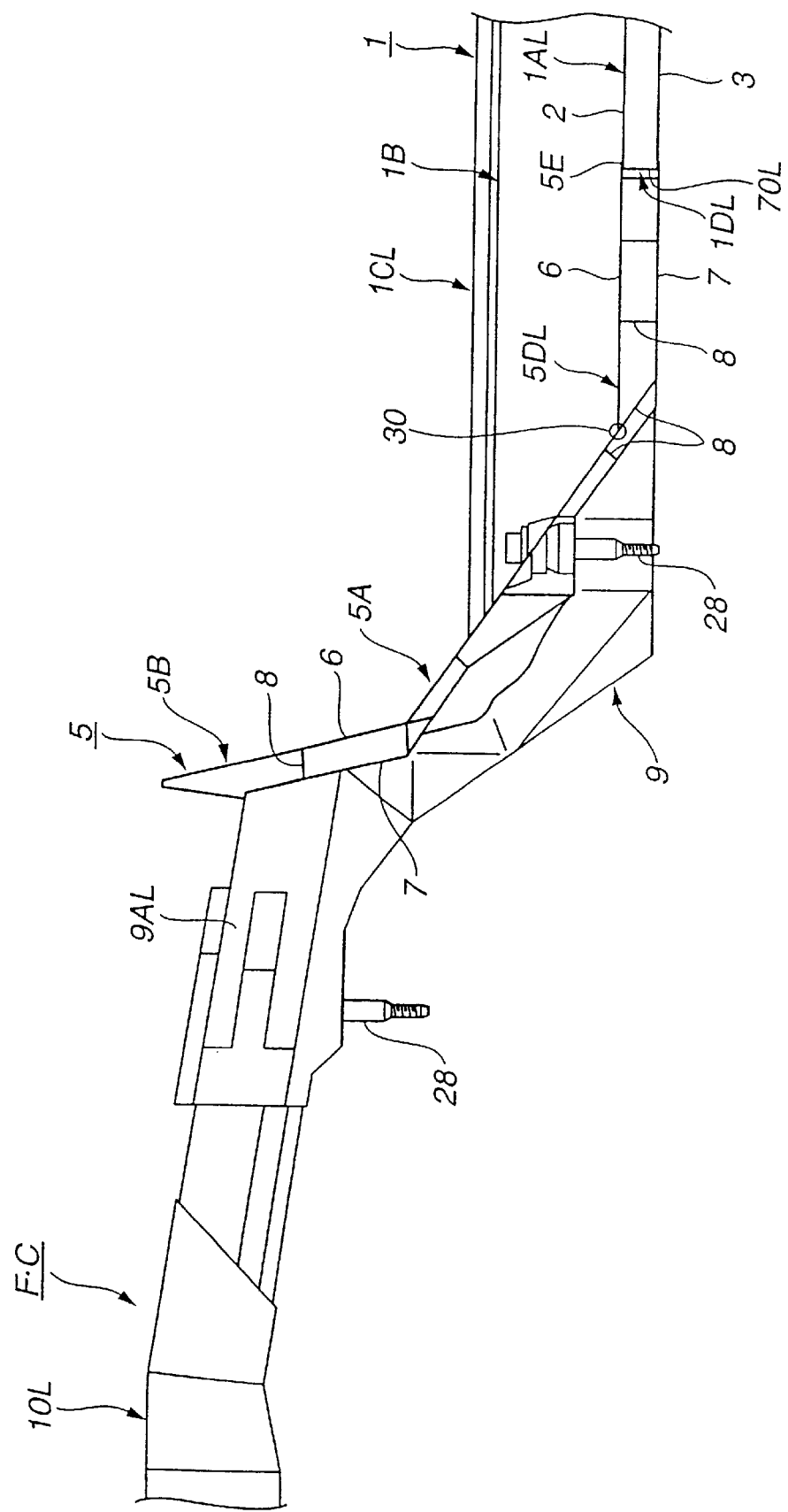
FIG. 3 is a fragmentary side view of the vehicle body structure along line III—III in FIG. 2.

As shown in FIGS. 2 and 3, the dash cross member 5 has a toe board section 5A and a vertically extending wall section 5B that extends from the toe board section 5A. Similar to the floor 1, the dash cross member 5 is formed by extruding an aluminum alloy in a direction that is substantially parallel to the transverse line 52. The dash cross member 5 has two spaced walls, namely an inner wall 6 and an outer wall 7, and partitions 8 between the two spaced walls 6 and 7. The partitions 8 and the two spaced walls 6 and 7 cooperate with each other to define, between the two spaced walls 6 and 7, a plurality of parallel channels that extend substantially parallel to the transverse line 52. The dash cross member 5 has the same cross sectional profile over its entire length along the transverse line 52. The partitions 8 enhance the rigidity of the dash cross member 5.

The dash cross member 5 has a cutout 5C that receives the tunnel 1B of the floor 1. This cutout 5C is cut inwardly into the toe board section 5A at a midpoint between opposite ends of the toe board section 5A. A reinforcement structure 9 extends over the outer wall 7 from the vertically extending wall section 5B to the toe board section 5A. The reinforcement structure 9 has two arms, namely a left-hand arm 9AL and a right-hand arm 9AR, that extend in a lengthwise forward direction of the vehicle substantially parallel to the longitudinal central line 50. The two arms 9AL and 9AR are spaced from each other in the transverse direction of the vehicle and fixedly support front left-hand and right-hand side members 10L and 10R, respectively.

As shown in FIGS. 1 and 2, the front compartment is at least partially defined by a first cross member 11 and a bumper armature 12, which connect the forward end portions of the front side members 10L and 10R, the front side members 10L and 10R, strut housings 20L and 20R. Mount bolts 28 are used to mount a suspension member (FIG. 3). The front compartment F•C houses the engine.

With its cutout 5C coupled to the tunnel 1B, the toe board section 5A of the dash cross member 5 is brought into abutting contact with the forward ends of the side sills 1CL and 1CR. Using an appropriate welding technique, such as laser welding or metal inert gas (MIG) welding, the joints between the toe board section 5A and the forward ends of the side sills 1CL and 1CR are welded, and the joint between the cutout 5C and the tunnel 1B is welded. Of course, any other appropriate attachment technique may be used instead of welding.

As shown in FIG. 2, the floor 1 includes a first or left-hand floor panel portion AL that is disposed between the tunnel 1B and the first side sill 1CL. The floor 1 also includes a second or right-hand floor panel portion 1AR that is disposed between the tunnel 1B and the second side sill 1CR.

Figure 4:
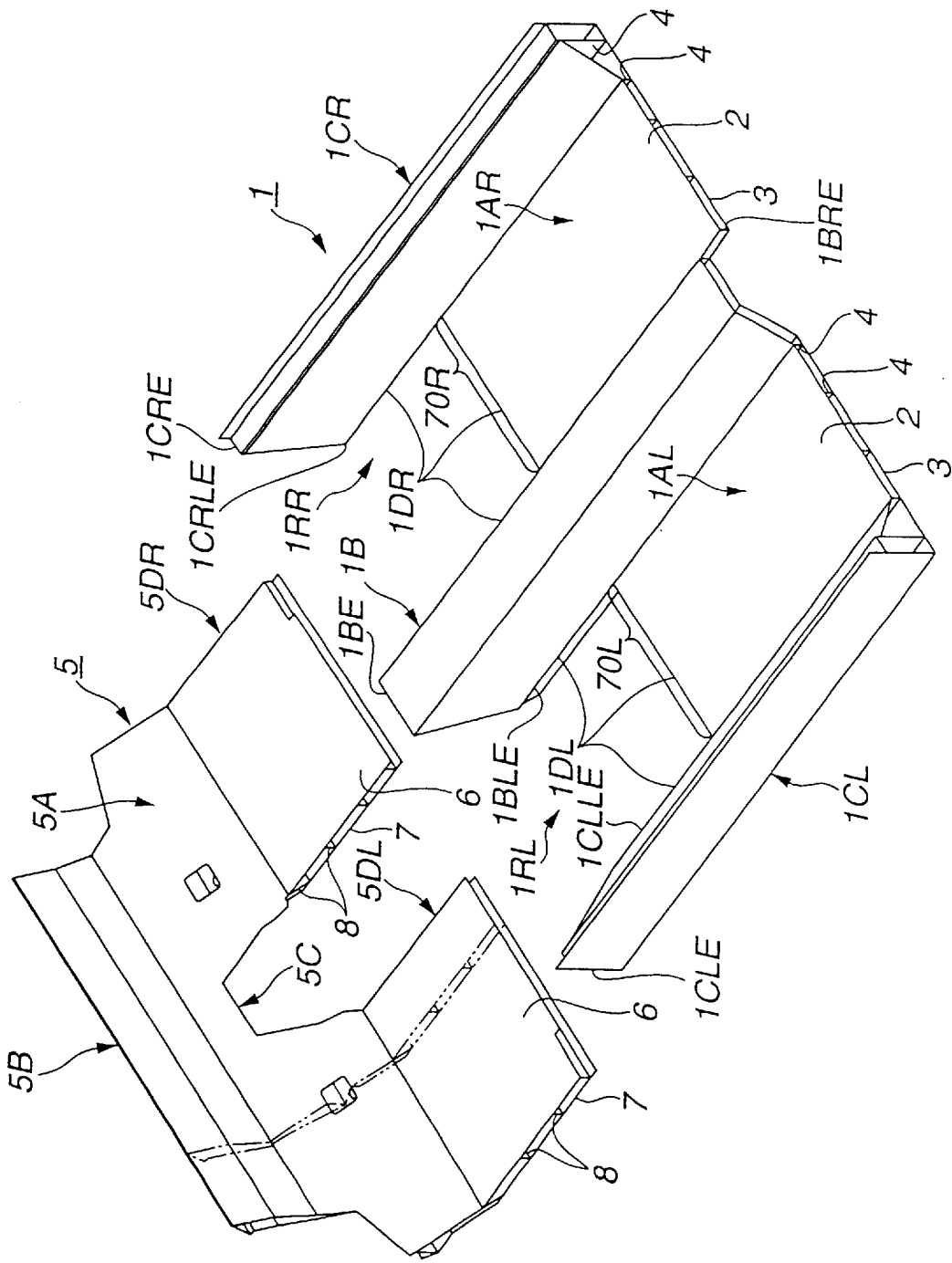
FIG. 4 is an exploded view of the vehicle body structure of FIG. 2.

The tunnel 1B and left and right side sills 1CL and 1CR, respectively, have forward edges or ends 1BE, 1CLE, and 1CRE, respectively. The forward ends 1BE, 1CLE, and 1CRE contact the dash cross member 5 and are welded to the dash cross member 5. The left-hand floor panel portion 1AL has a forward edge 70L that is recessed from the tunnel forward edge 1BE and the left-hand side sill forward edge 1CLE to define a first recess 1RL (FIG. 4). The right-hand floor panel portion 1AR has a forward edge 70R that is recessed from the tunnel forward edge 1BE and the right-hand side sill forward edges 1CRE to form a recess 1RR (FIG. 4).

The left-hand side sill 1CL has a lateral edge 1CLLE that extends rearward from its forward end 1CLE. The right-hand side sill 1CR has a lateral edge 1CRLE that extends rearward from its forward end 1CRE. The tunnel 1B has opposing lateral edges 1BLE and 1BRE that extend rearward from its forward end 1BE. The left-hand side sill lateral edge 1CLLE, the left-hand floor panel forward edge 70L and the tunnel lateral edge 1BLE define a first or left recess defining edge 1DL. The right-hand side sill lateral edge 1CRLE, the tunnel lateral edge 1BRE, and the right-hand floor panel forward edge 70R define a second or right-hand recess defining edge 1DR.

The cross member 5 includes a first tooth 5DL that extends integrally from the toe board section 5A. The first tooth 5DL is coupled to the first or left-hand recess 1RL and is connected to the floor 1 along the first recess defining edge 1DL. The cross member 5 also includes a second tooth 5DR that extends integrally from the toe board section 5A. The second tooth 5DR is coupled to the second or right-hand recess 1RR and is connected to the floor 1 along the second recess defining edge 1DR. In the first embodiment, the first and second recesses are rectangular.

The first and second teeth 5DL and 5DR are each extruded concurrently with the other portions of the cross member 5. The first and second teeth 5DL and 5DR have the same cross sectional profile over their entire lengths in the transverse direction and include a plurality of channels between the inner and outer walls 6 and 7. The channels are separated by partitions 8. The partitions 8 interconnect the inner and outer walls 6 and 7 to enhance the rigidity of the first and second teeth 5DL and 5DR. The first and second teeth 5DL and 5DR are fitted into the first and second recesses, respectively, surrounded by the first and second recess defining edges 1DL and 1DR, and welded to the tunnel 1B, the floor panel portions 1AL and 1AR, and the side sills 1CL and 1CR.

In this first embodiment, each of the first and second teeth 5DL and 5DR has a socket 5E into which the forward edge 70L and 70R of one of the first and second floor panel portions 1AL and 1AR is fitted prior to welding. If desired, a physically separate joint may be used to connect each of the first and second teeth 5DL and 5DR to one of the first and second floor panel portions 1AL and 1AR.

With their forward ends 1CLE and 1CRE in abutting contact with the toe board section 5A, each of the side sills 1CL and 1CR has its inner lower portion lying over the side of one of the first and second teeth 5DL and 5DR prior to welding. Accordingly, each of the side sills 1CL, 1CR has an elongated flat surface area having a width equal to the thickness of the respective one of the first and second teeth 5DL and 5DR.

The preceding description clearly indicates that the dash cross member 5 and the floor 1 share a common boundary and are joined to each other. During a frontal full-lap crash of the vehicle, the dash cross member 5 is subject to a moment about an axis 30, which lies substantially parallel to the transverse line 52. In a region near this axis 30 of moment, the forward ends of the side sills 1CLE and 1CRE are in abutting engagement with the toe board section 5A of the dash cross member 5. The tunnel 1B extends through the cutout 5C. According to the preceding description, the cross member 5 and each of the floor panel portions 1AL and 1AR has a common boundary at 70L or 70R and are joined to each other such that the common boundary is not disposed within the region near the axis 30 of moment. In order to suppress variation of stress across the common boundary when the cross member 5 is subject to a moment about the axis 30, the cross member 5 includes an integral portion in the form of teeth 5DL and 5DR. The teeth 5DL and 5DR extend rearward substantially parallel to the longitudinal central line 50 and have a periphery. Each of the floor panel portions 1AL and 1AR has a forward edge 70L and 70R, respectively. As described earlier, the tunnel 1B has opposing lateral edges 1BLE and 1BRE and the side sills each have rearward extending lateral edges 1CLLE and 1CRLE that, together with the forward edges 70L and 70R of the floor panel portions 1AL and 1AR, mate with the respective tooth 5DL and 5DR.

Figure 8:
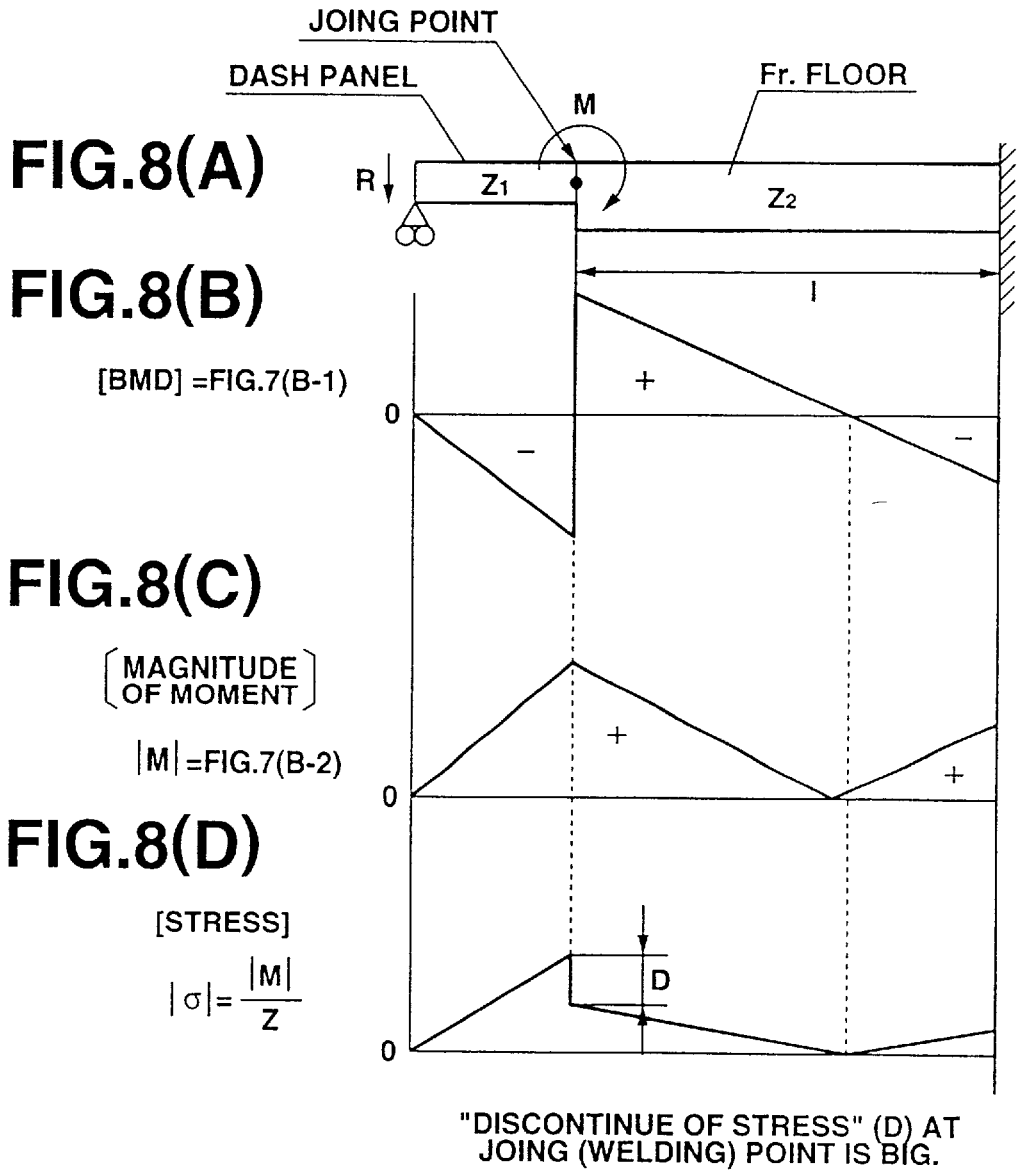
FIG. 8(A) is a schematic illustration of a comparative example where a common boundary between a cross member and a floor includes the axis of the moment.
FIG. 8(B) is the same diagram as FIG. 7(B) of the example of FIG. 8(A)
FIG. 8(C) is the same diagram as FIG. 7(C) of the example of FIG. 8(A)
FIG. 8(D) is a stress diagram illustrating the variation of stress to which the structure of FIG. 8(A) is subject against varying distance.

A stress diagram of a comparative example is shown in FIGS. 8(A), 8(B), 8(C), and 8(C) when a dash cross member 5 is subject to a moment about the axis 30. In the comparative example, a common boundary between the dash cross member 5 and a floor 1 includes the axis 30 of the moment. In FIG. 8(A), the reference character I (el) represents a distance along the longitudinal central line 50 from the axis 30 to a rear seat cross member 13 (see FIG. 1). The reference character $Z_1$ represents a section modulus of the dash cross member 5. The reference character $Z_2$ represents a section modulus of the floor 1. It is seen that there occurs a change in rigidity across the common boundary so that the section modulus is subject to a change across the common boundary. FIG. 8(B) illustrates the bending moment at various locations along the central longitudinal line. As shown, the bending moment has a negative maximum at the axis 30, which is also the joining point and a maximum positive bending moment at the axis 30, thus creating a large stress discontinuity at the axis 30—the joining point—which is undesirable. FIG. 8(C) illustrates the magnitude of moment at various locations along the longitudinal central line. The magnitude of the moment is at a maximum at the axis 30 and decreases as the distance from the axis 30 increases. FIG. 8(D) illustrates the stress variation in a less preferred pattern. According to this less preferred pattern of stress variation, the discontinuity D of stress across the common boundary has a considerably large magnitude, which results in a serious stress concentration at the common boundary.

Figure 7:
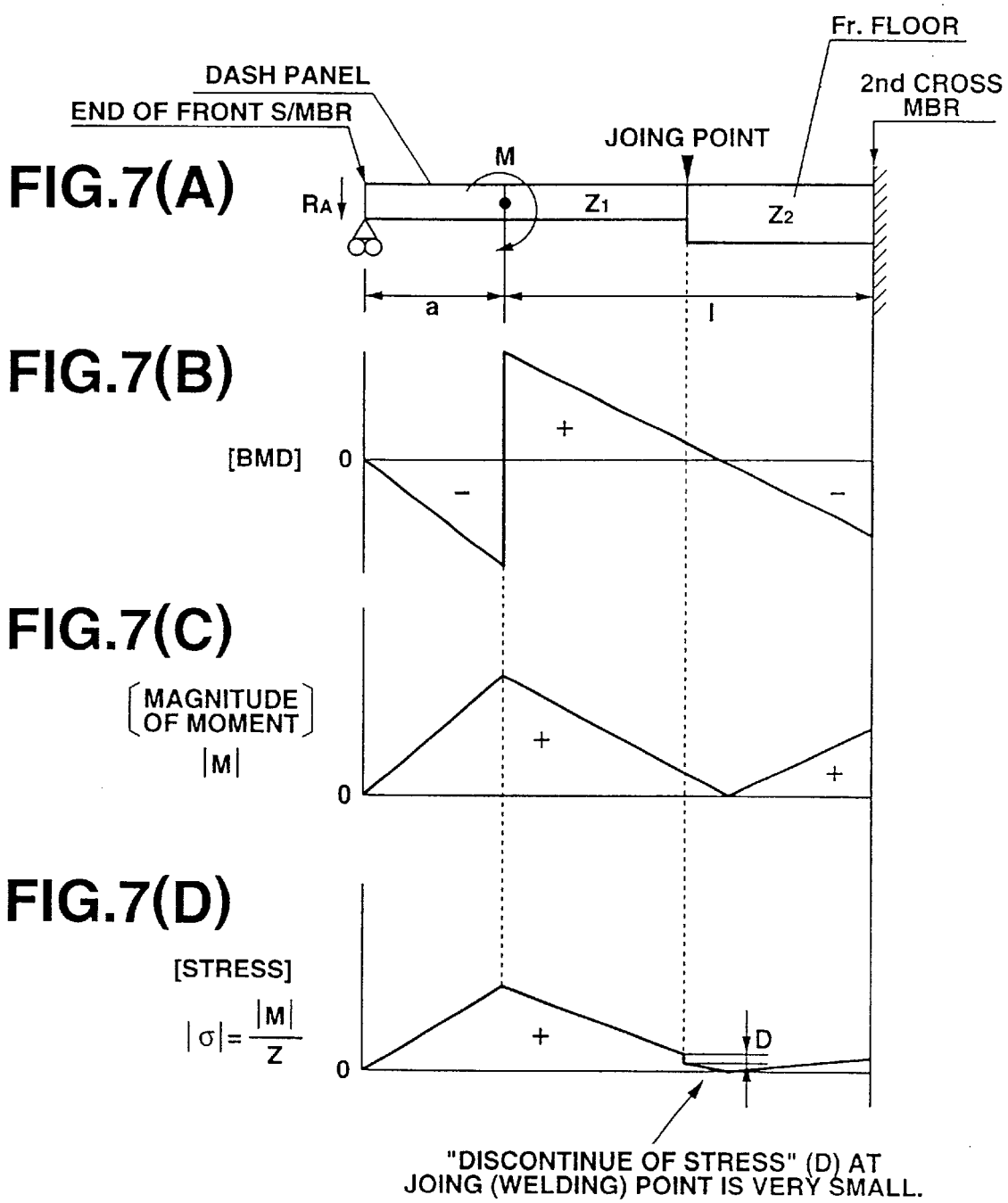
FIG. 7(A) is a schematic illustration of the first embodiment.
FIG. 7(B) is a bending moment diagram illustrating the bending moment along the first embodiment of FIG. 7(A)
FIG. 7(C) is a diagram illustrating the variation of the magnitude of moment about an axis below a toe board section of the cross member against varying distance.
FIG. 7(D) is a stress diagram illustrating the variation of stress to which the structure of FIG. 7(A) is subject against varying distance.

A stress diagram of the first embodiment is shown in FIGS. 7(A), 7(B), 7(C), and 7(D). The first embodiment utilizes the tooth 5DL, 5DR and recess 1RL, 1RR structure of FIGS. 2–5 to control the stress variation in a preferred pattern as illustrated in FIG. 7(B) and 7(C). FIGS. 7(B)–7(D) indicate that the discontinuity D of stress across the common boundary has a satisfactorily small magnitude. This reduction in the magnitude of the discontinuity D has resulted from locating the common boundary within a region where the magnitude of moment is very small and almost zero. Thus, the stress concentration at the common boundary is satisfactorily low.

During frontal full-lap crash, the front side members 10L and 10R apply the impact, which induces a moment about the axis 30. The axis 30 extends through the curved portion of the sloped lower edge of the toe board section 5A. The joints between the teeth 5DL and 5DR and the floor panel portions 1A are at a distance from the axis 30. Accordingly, excessively great concentration of stress on the joints will not take place.

Figure 5:
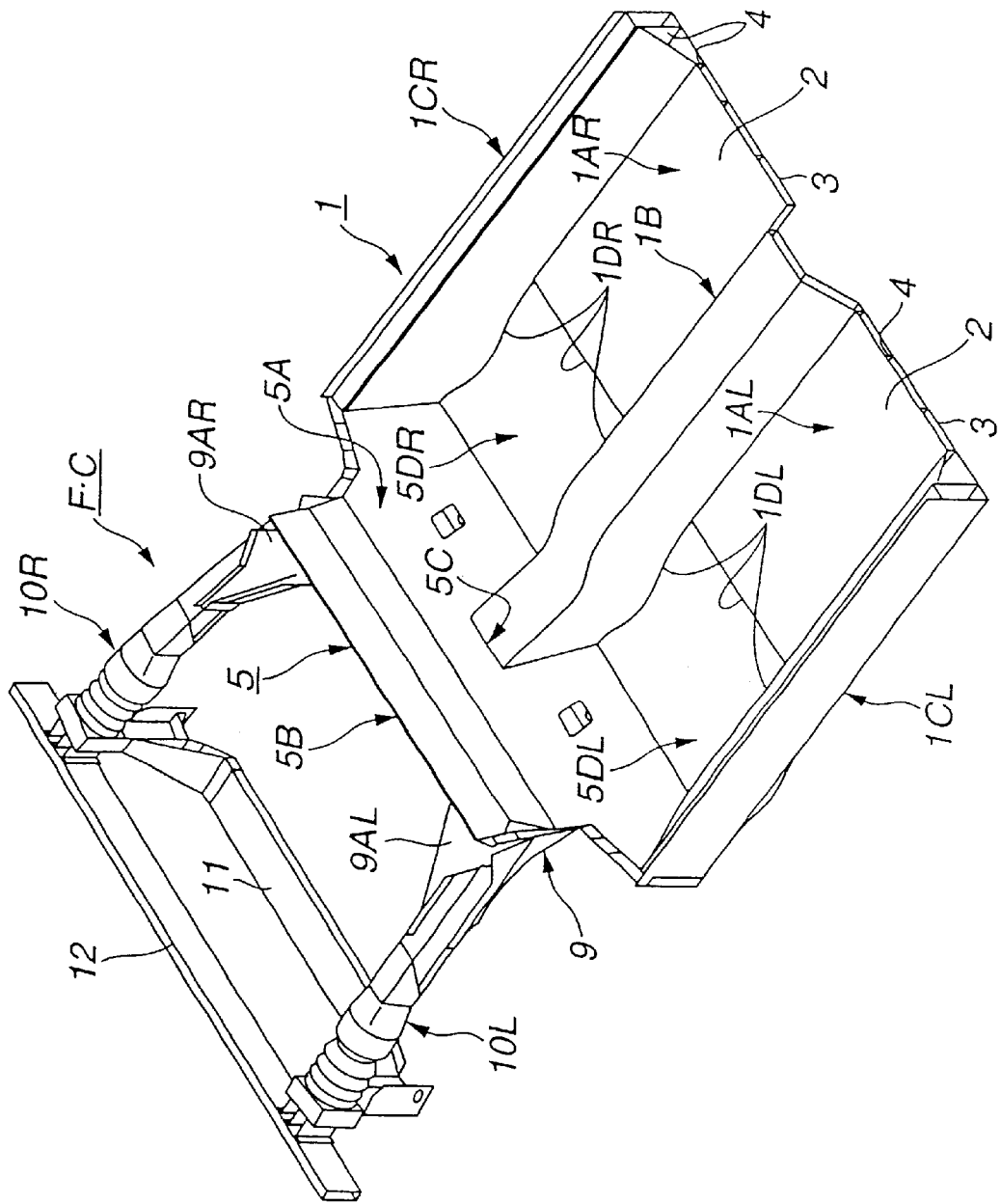
FIG. 5 illustrates the vehicle body structure after a frontal full-lap crash of the vehicle.

The dash cross member 5 has a rigidity that is sufficiently large to support the front side members 10L, 10R such that, as shown in FIG. 5, the front side members 10L and 10R collapse telescopically rearward from their forward ends in a predetermined manner, which results in an increased collapsible stroke of the front compartment F•C. This causes an increase in impact energy absorption.

Figure 6:
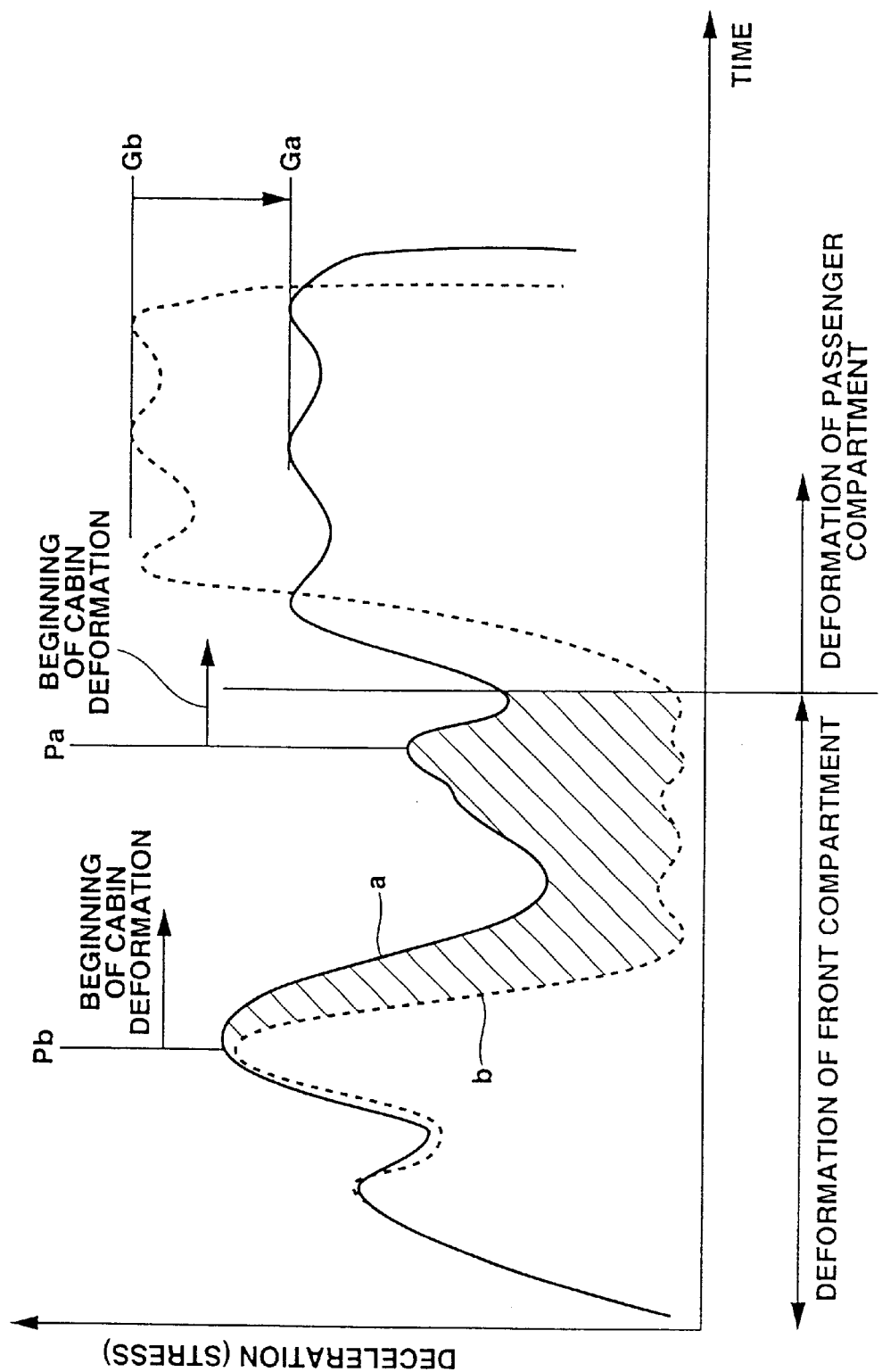
FIG. 6 illustrates energy absorption during frontal full-lap crash.

Referring to FIG. 6, curve "a" (solid line) is the impact energy absorption characteristic curve of the first preferred embodiment during a frontal full-lap crash. Curve "b" (dashed line) is the impact energy absorption characteristic curve of the comparative example during a frontal full-lap crash. According to the comparative example, the length of each of the teeth 5DL and 5DR is zero and the depth of each of the recesses is zero so that the toe board section 5A has its lower edge directly coupled with the first and second panel portions 1AL and 1AR. In FIG. 6, according to the impact energy absorption curve "a," the dash cross member 5 is collapsed at time Pa. According to the impact energy absorption curve "b," the dash cross member 5 is collapsed at time Pb. Time Pa is considerably delayed with respect to time Pb, which causes an increase, as indicated by a shadowed area, in the amount of impact energy absorbed by collapsible deformation of the front compartment F•C. This increase in the amount of impact energy due to the collapsible deformation of the front compartment F•C results in a suppressed deformation of the passenger compartment P•C.

According to the first embodiment, the tunnel 1B and the side sills 1CL and 1CR project forward beyond the forward edges 70L and 70R of the floor panel portions 1AL and 1AR. The forward portion of the floor exhibits a reduction in bending rigidity, which results in a considerable reduction in the level of impact from Gb to Ga. In FIG. 6, the reference characters Gb and Ga indicate levels of impact due to collapsible deformation of the passenger compartments according to the comparative example and the first embodiment, respectively.

According to the first embodiment, it is easy to design the amount of offset of the common boundary 70L and 70R from the moment axis 30. This results from the arrangement of the teeth 5DL and 5DR fitted into recesses 1RL and 1RR.

Each tooth 5DL or 5DR and the corresponding recess 1RL and 1RR are rectangular in plan view, which renders them easy to manufacture. Thus, it is easy to provide a sufficiently high level of joining strength between each tooth 5DL or 5DR and one of the recess defining edges 1DL and 1DR.

From the preceding description on the first embodiment, it is also very apparent that each of the floor panel portions 1AL and 1AR has a forward edge 70L and 70R that extends substantially parallel to the transverse line 52. It is also understood that, at any point on the entire length along the transverse line 52, the first and second teeth 5DL and 5DR extend toward the first and second floor panel portions 1AL and 1AR, respectively, by a common length, thus exhibiting rectangular plan profiles.

Figure 9:
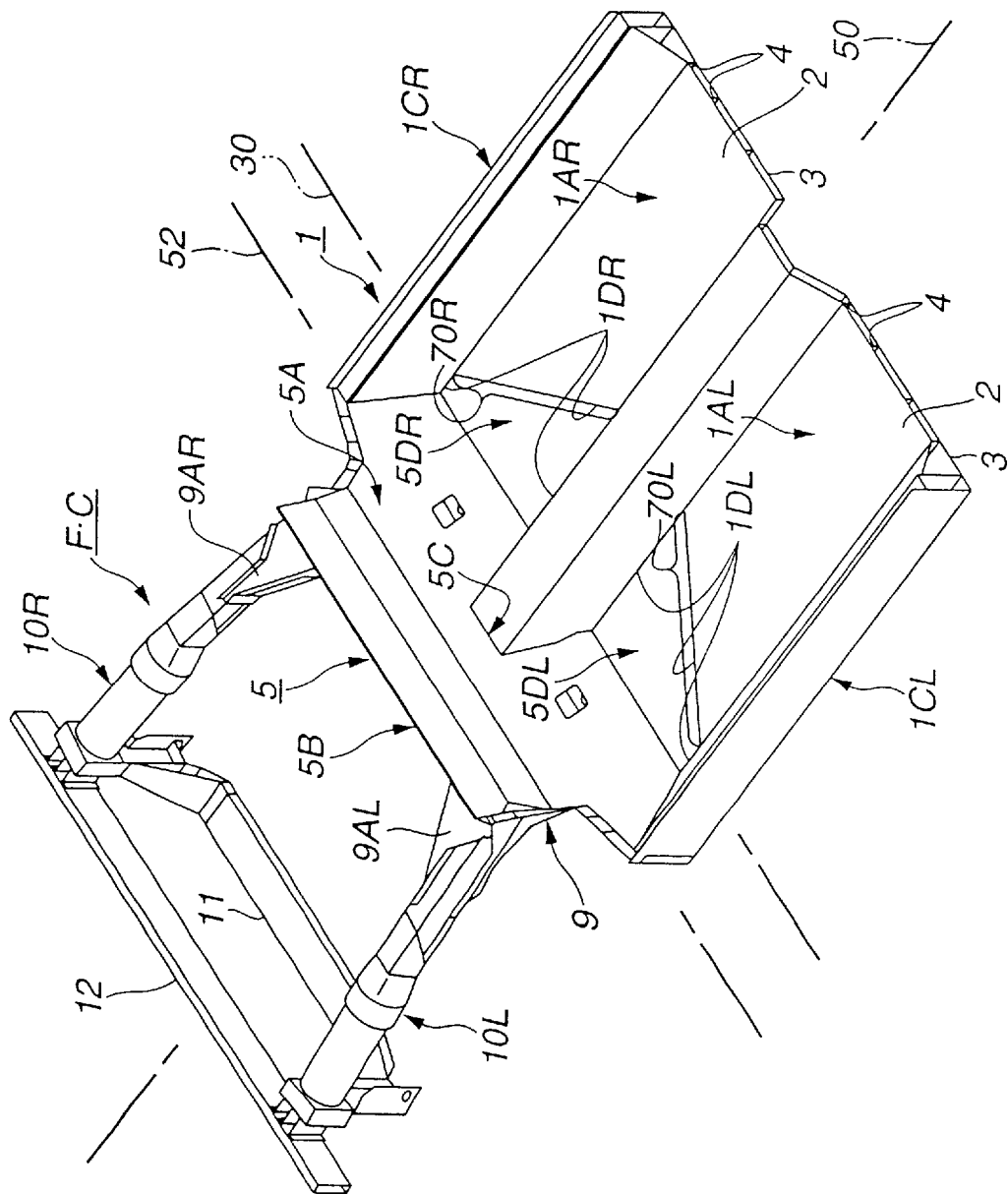
FIG. 9 is a view similar to FIG. 2 illustrating a second embodiment of the present invention.
Figure 10:
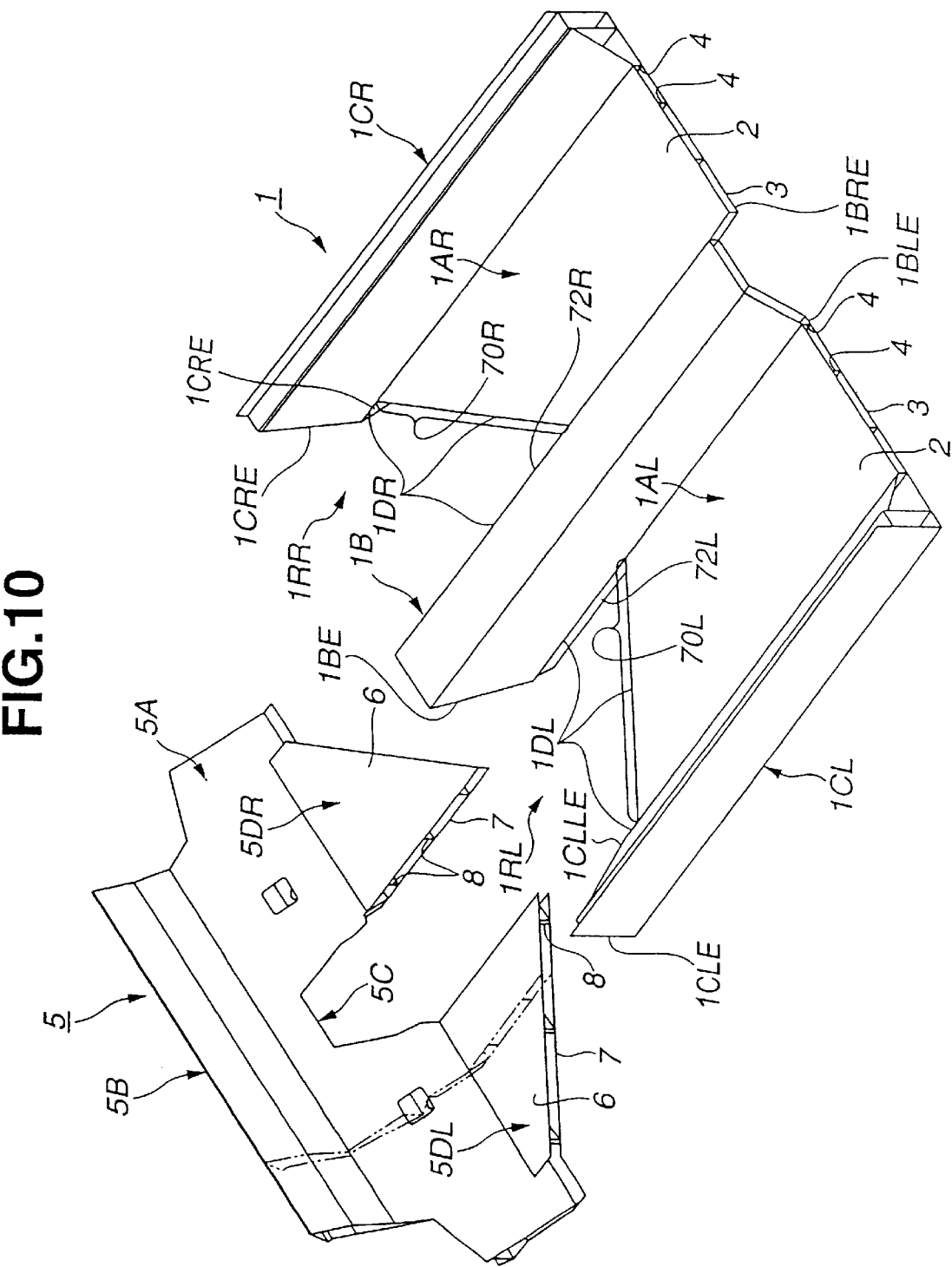
FIG. 10 an exploded view of the vehicle body structure of FIG. 9.
Figure 11:
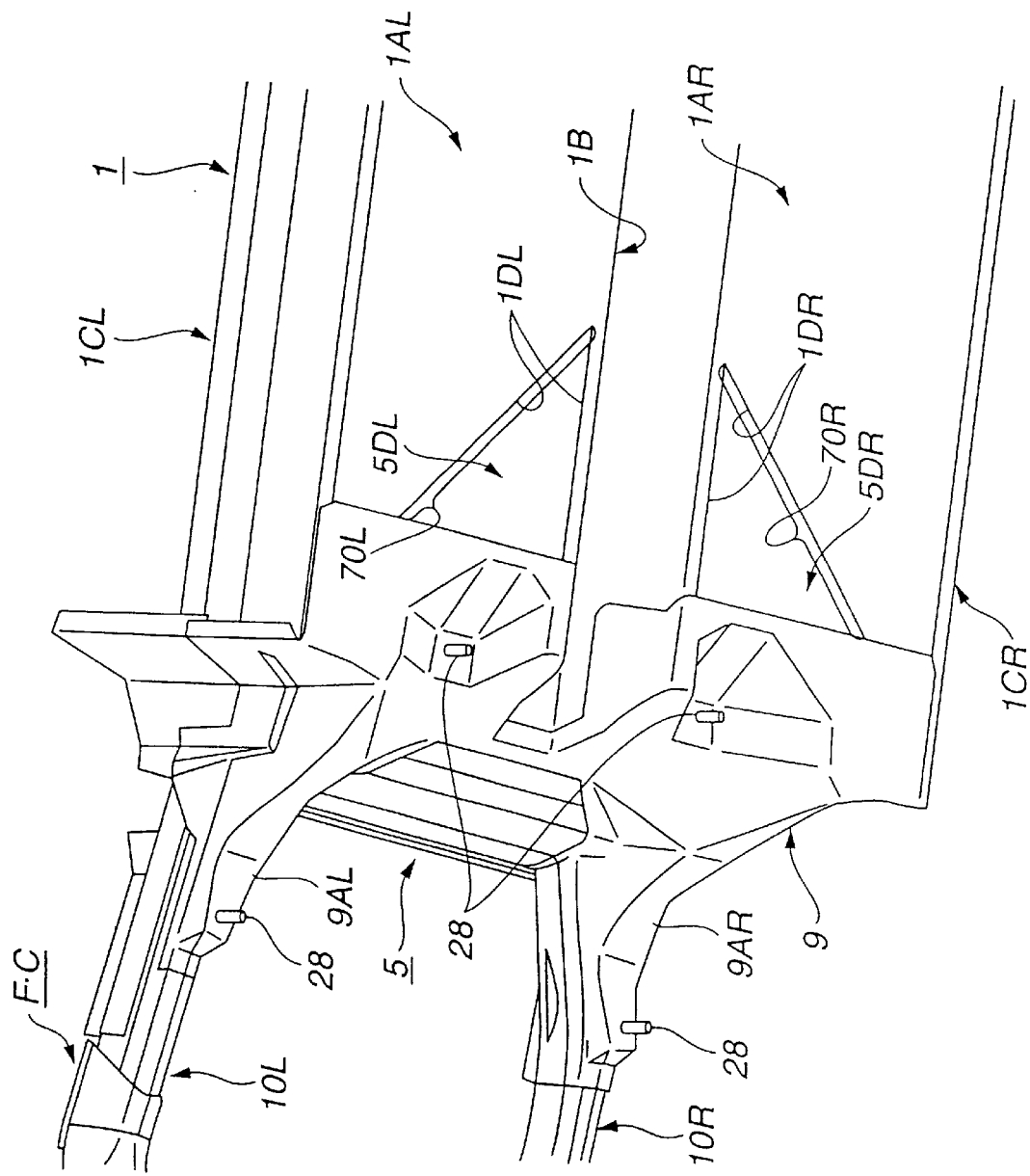
FIG. 11 is a fragmentary bottom perspective view of the vehicle body structure of FIG. 9.

A second embodiment of the invention will now be described with reference to FIGS. 9 to 11. The second embodiment is substantially the same as the first embodiment except that, in the second embodiment, the first and second teeth 5DL and 5DR and the associated recesses 1RL and 1RR have substantially triangular profiles. Each of the forward edges 70L, 70R of the first and second floor panel portions 1AL and 1AR lie obliquely with respect to a transverse line 52. As shown in FIG. 10, the entirety of forward edge 70L, 70R lies behind or rearward of the ends 1CLE, 1CRE, 1BE of the respective side sill 1CL, 1CR and the tunnel 1B.

The first tooth 5DL extends toward the first floor panel portion 1AL by a length that is proportional to a distance from the left-hand side sill 1CL toward the tunnel 1B along the transverse line 52. The second tooth 5DR extends toward the second floor panel portion 1AR by a length that is proportional to a distance from the right-hand side sill 1CR toward the tunnel 1B along the transverse line 52. Each of the first and second recess defining edges 1DL, 1DR also includes a laterally extending edge 72L, 72R, which extend substantially parallel to the longitudinal center line. Each laterally extending tunnel edge 72L, 72R meets the respective forward edge of the floor panel 70L, 7OR to form a "V".

According to the second embodiment, each of the longitudinally extruded first and second floor panel portions 1AL, 1AR has a length that increases or projects from the tunnel 1B to the forward ends 1CLE, 1CRE of the side sills 1CL and 1CR. This arrangement provides for increased impact energy absorption within a limited amount of deformation at the forward portion of the floor 1 during side impact.

During side impact, collapsible deformation of the floor 1 is initiated at its connection with the adjacent center pillar 16L or 16R (see FIG. 1). The collapsible deformation spreads in all directions. Because each extruded floor panel 1 AL, 1 AR projects toward the forward ends 1RLE, 1CRE of the side sills 1CL, 1CR (i.e., the portion forward portion of the floor 1), the amount of impact energy at the forward portion of the floor 1 increases. The transversely extruded tooth 5DL or 5DR prevents inward deformation of the forward portion of the floor 1 beyond the limited amount. Accordingly, a desired deformation mode is provided during side impact.

In the second embodiment, the teeth 5DL and 5DR are welded to the respective floor panel portions 1AL, 1AR, respectively, along the forward edges 70L, 70R. The teeth 5DL, 5DR are also welded to the structure at the lateral edges 1BLE, 1BRE of the tunnel 1B at the lateral edges 1CLLE, 1CRLE of the side sills 1CL, 1CR. If desired, the teeth 5DL and 5DR may be welded to the floor panel portions 1AL and 1AR, respectively, through convex curved lines that project toward the floor panel portions 1AL and 1AR to meet various demands on deformation mode.

Figure 25A:
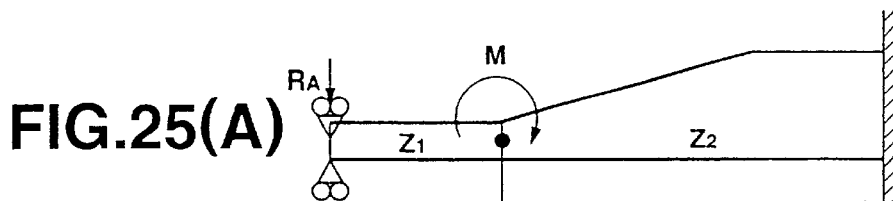
FIG. 25(A) is a schematic illustration of the second embodiment.
Figure 25B:
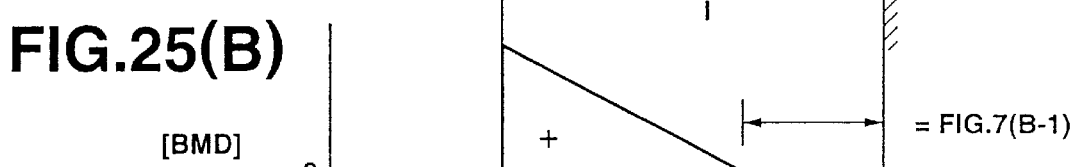
FIG. 25(B) is a bending moment diagram illustrating the bending moment along the second embodiment of FIG. 25(A)
Figure 25C:
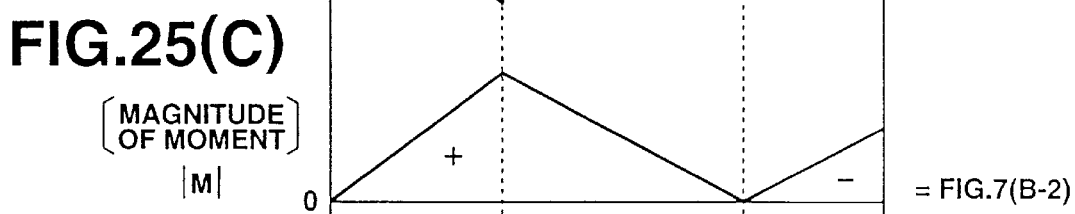
FIG. 25(C) is a diagram illustrating the variation of the magnitude of moment about an axis below a toe board section of the cross member against varying distance.
Figure 25D:
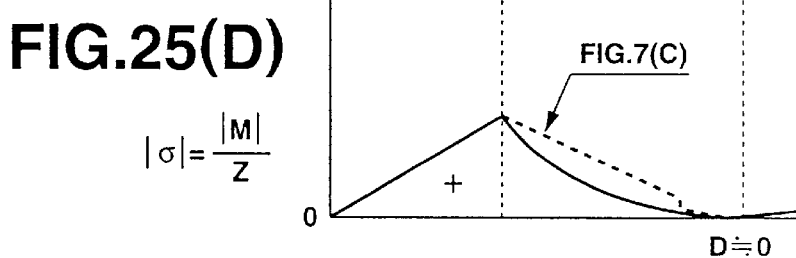
FIG. 25(D) is a stress diagram illustrating the variation of stress to which the structure of FIG. 25(A) is subject against varying distance.

A stress diagram of the second embodiment is shown in FIGS. 25(A), 25(B), 25(C), and 25(D). The second embodiment utilizes the tooth 5DL, 5DR and recess 1RL, 1RR structure of FIG. 9 to control the stress variation in an even more preferred pattern as illustrated in FIGS. 25(B) and 25(P). FIGS. 25(B)–25(D) indicate that the discontinuity D of stress across the common boundary is substantially zero due to the triangular shape of the recess and tooth. This reduction in the magnitude of the discontinuity D has resulted from locating the common boundary proportionally from the moment axis rearward to a point that is distant from the moment axis. Thus, the stress concentration at the common boundary is substantially zero.

Figure 12:
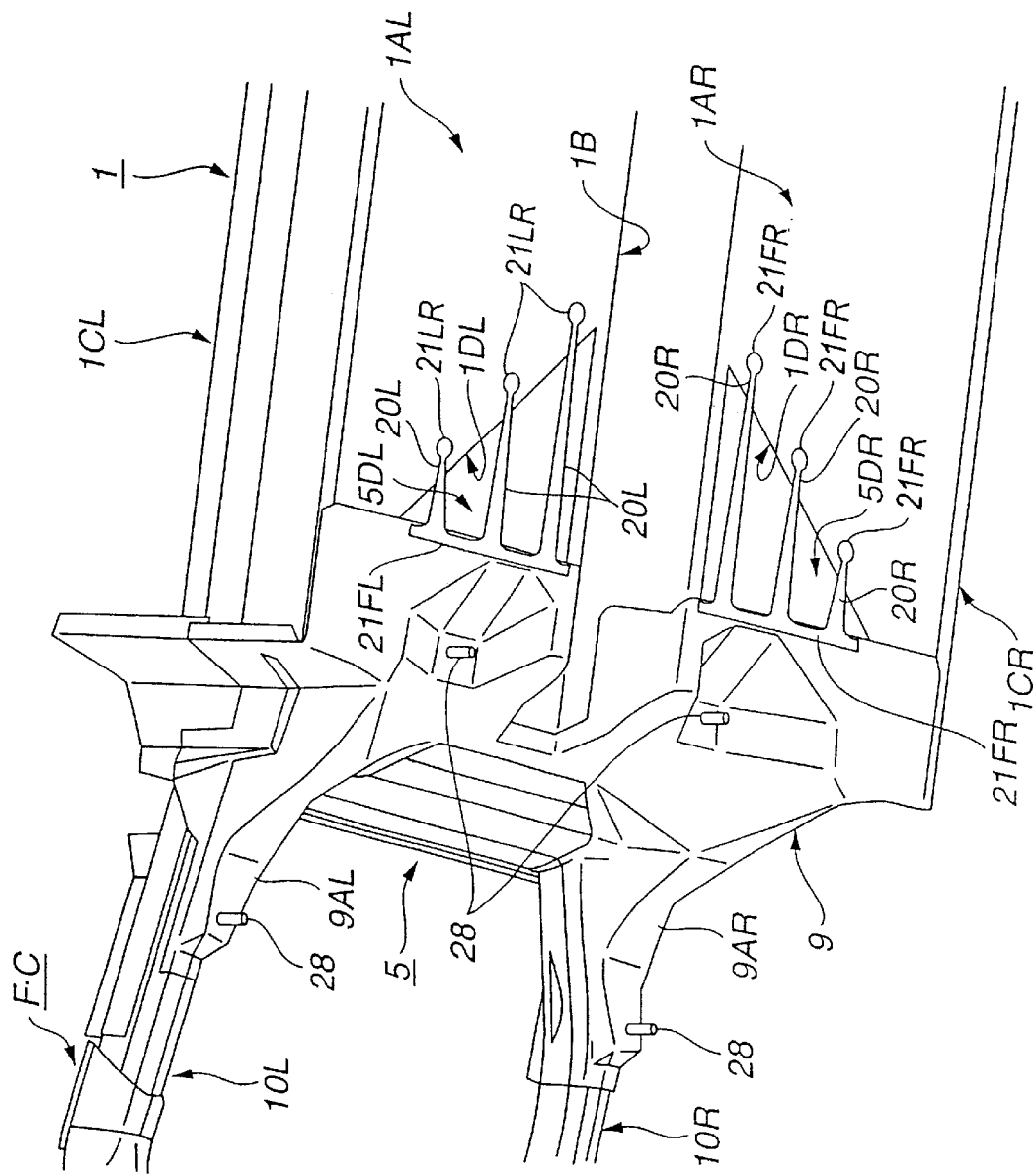
FIG. 12 is a view similar to FIG. 11 illustrating a third embodiment of the present invention.

A third embodiment will be described with reference to FIG. 12. This third embodiment is substantially the same as the second preferred embodiment except that a first group of parallel reinforcement bars 20L and a second group of parallel reinforcement bars 20R are provided. The first and second group of reinforcement bars 20L, 20R are attached to the lower side of the floor 1.

Each reinforcement bar 20L of the first group extends substantially parallel to the longitudinal central line 50 across the forward edge 70L of the left-hand floor panel 1AL. Each reinforcement bar 20R of the second group extends substantially parallel to the longitudinal central line 50 across the forward edge 70R of the right-hand floor panel 1AR. In the third embodiment, as is true in the second embodiment, the forward edges 70L, 70R of the left-hand and right-hand floor panels 1AL, 1AR extend at obliquely from the transverse line 52.

Each of the reinforcement bars 20L of the first group has a forward end integrated with a common seat 21FL, which is fixedly attached to a base of the first tooth 5DL, and a rearward end formed with an independent seat 21RL, which is fixedly attached to the lefthand floor panel portion 1AL.

Each of the reinforcement bars 20R of the second group has a forward end integrated with a common seat 21FR, which is fixedly attached to a base of the second tooth 5DR, and a rearward end formed with an independent seat 21RR, which is fixedly attached to the right-hand floor panel portion 1AR.

Each of the first and second groups of reinforcement bars 20L, 20R is made of a light metal and is die cast, pressed, or extruded. Each reinforcement bar 20L, 20R has a cross-sectional area that decreases as a distance from a dash cross member 5 increases.

According to the third embodiment, the reinforcement bars 20L, 20R strengthen the connection between the teeth 5DL and 5DR and the associated floor panel portions 1AL and 1AR.

Figure 13:
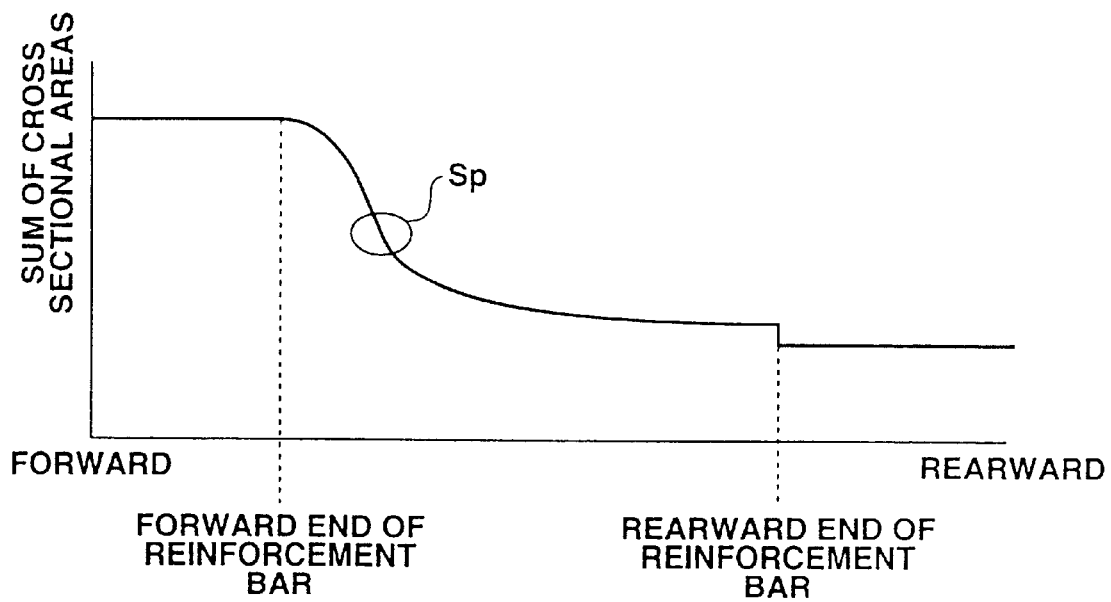
FIG. 13 is graphical representation of the variation of the cross-sectional area of each of the reinforcement bars versus the distance from a cross member.

Let us now consider two hypothetical parallel vertical (HPV) planes having interposed therebetween a selected one of the reinforcement bars 20L, 20R. At each point along the selected bar, a sum of the cross-sectional area of the reinforcement bar and a cross-sectional area of that portion of a tooth which is disposed between the HPV planes or a cross sectional area of that portion of a floor panel portion which is disposed between the HPV planes is calculated. FIG. 13 is the plotting of the calculated results of the sum of the cross-sectional areas. The curve shown in FIG. 13 has an inflection point Sp. As shown by the curve in FIG. 13, the sum of cross-sectional areas reduces as the distance from the dash cross member 5 increases because each reinforcement bar 20L, 20R has a cross-sectional area that decreases as a distance from the dash cross member 5 increases. As a result, it is possible to set a point of inflection Sp anywhere within a region ranging from 20% to 50% in length from the forward end. Accordingly, the setting can be made such that points of inflection of all of the reinforcement bars 20L, 20R are located generally along the forward edges 70L, 70R of the left-hand and right-hand floor panels 1AL, 1AR, which is the arrangement in the third embodiment. Using this arrangement, it is possible to suppress the magnitude of the impact when the passenger compartment collapsibly deforms during a frontal full-lap crash.

Figure 14:
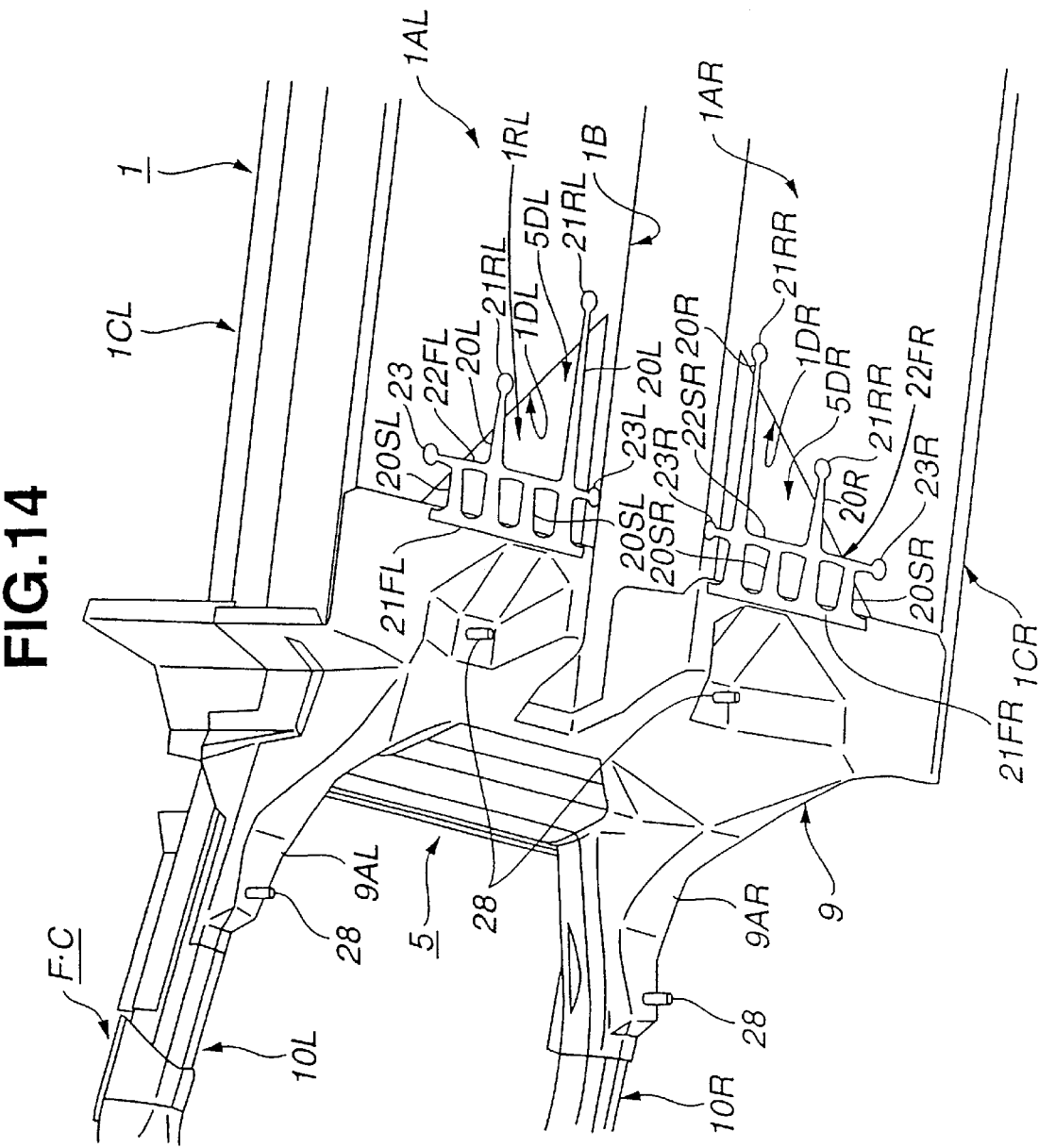
FIG. 14 is a view similar to FIG. 11 illustrating a fourth embodiment of the present invention.

A fourth embodiment of the invention will now be described with reference to FIG. 14. This fourth embodiment is a modification of the third embodiment. In contrast to the reinforcement bars 20L, 20R of the third embodiment, a first beam 22FL crosses and interconnects the reinforcement bars 20L of the first or left-hand group, and a second beam 22FR crosses and interconnects the reinforcement bars 20R of the second or right-hand group. The first and second beams 22FL, 22FR lie substantially parallel to the transverse line 52. Each end of the first beam 22FL has seat 23L that is fixedly attached to the left-hand floor panel 1AL to bridge the first recess 1RL. Each end of the second beam 22FR has a set 23R that is fixedly attached to the right-hand floor panel 1AR to bridge the second recess 1RR.

The first and second beams 22FR, 22FL are rigidly coupled to common seats 21FL, 211R, respectively. A plurality of small bars 20SL, 20SR interconnect each of the first and second beams 22FR, 22FL and its respective common seat 21FL, 21FR to increase structural rigidity.

The beams 22FR, 22FL act to reinforce the floor 1 during a side impact. Adjusting the number of small bars 20SL and 20SR makes it easy to adjust the location of the points of inflections Sp.

Figure 15A:
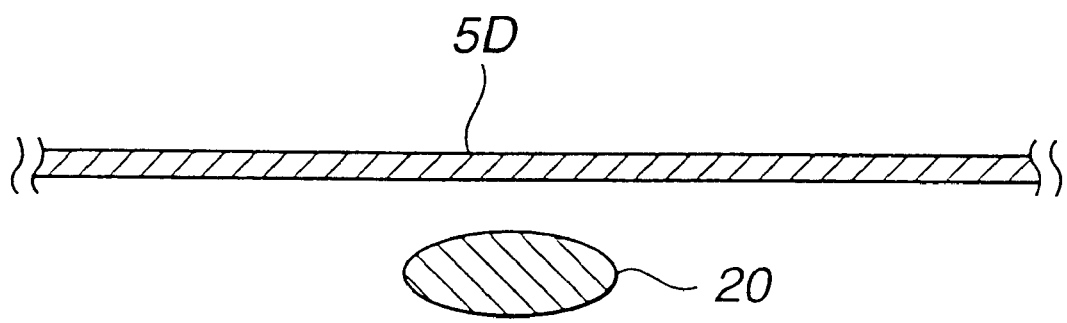
FIGS. 15(A) and 15(B) illustrate cross-sectional profiles of each of the reinforcement bars at its forward end and at its rearward end illustrating a fifth embodiment of the present invention.
Figure 15B:
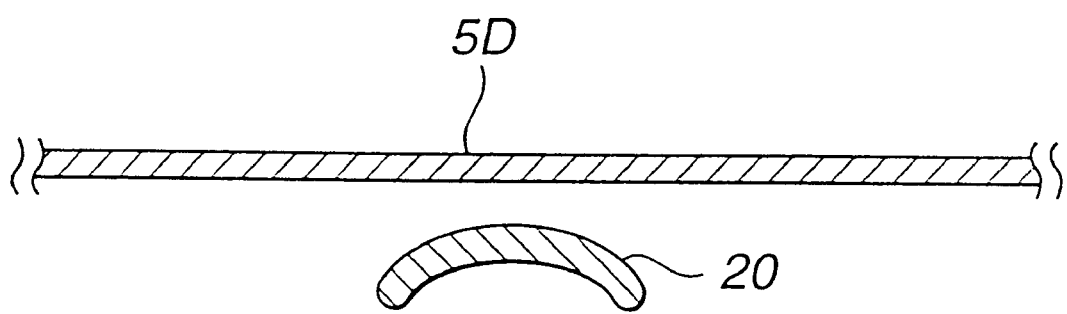

A fifth embodiment of the invention will now be described with reference to FIGS. 15(A) and 15(B). In the third and fourth embodiments, the reinforcement characteristic of each reinforcement bar 20L, 20R is adjusted by varying the cros-ssectional area. According to the fifth embodiment,. each reinforcement bar 20 has a flexural rigidity that decreases as a distance from the dash cross member 5 increases. Each reinforcement bar 20 has a cross-section that ranges from a predetermined elliptical cross-sectional profile as shown in FIG. 15(A) to an upwardly curved partial ring cros-ssectional profile as shown in FIG. 15(B), both of which are formed by vertical compression. The cross-sectional area is constant over the entire length of the reinforcement bar 20.

Figure 16:
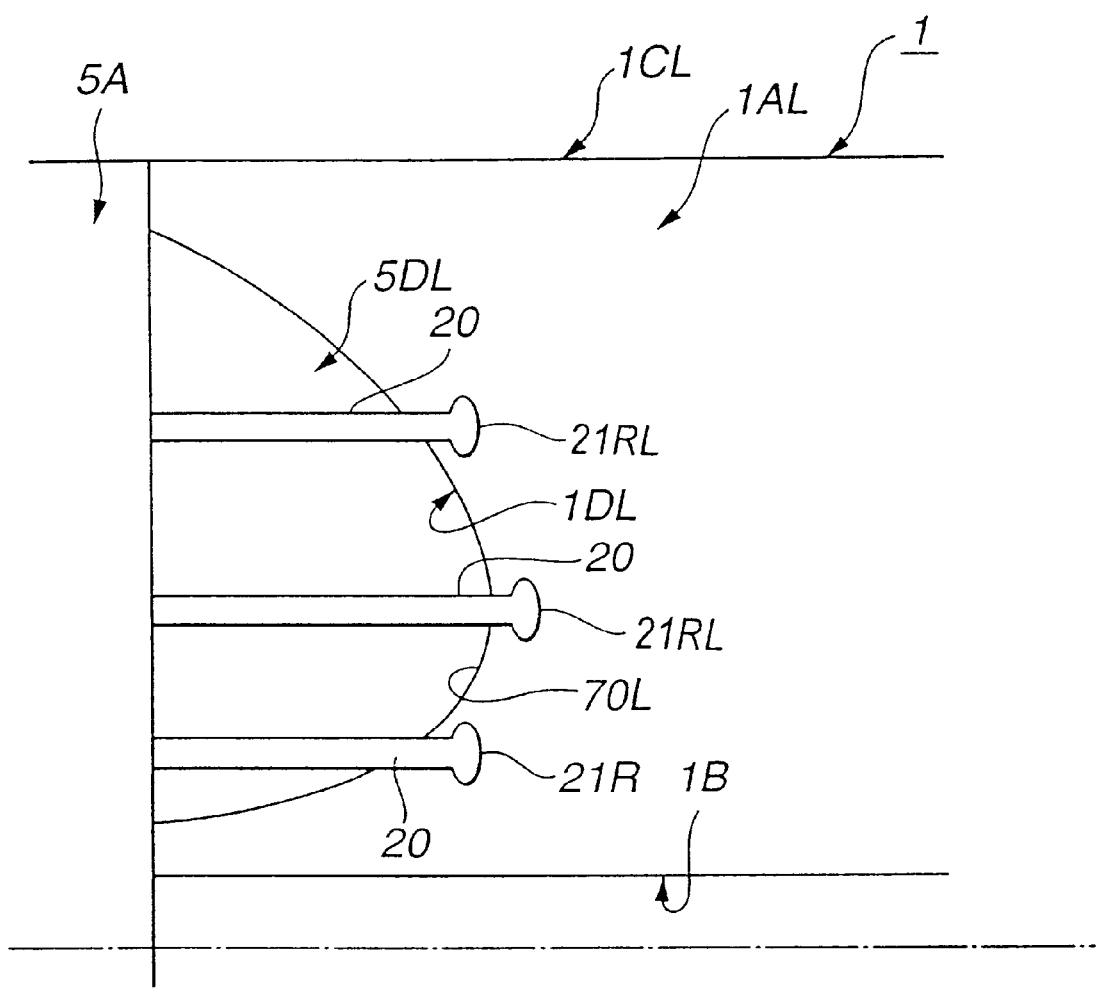
FIG. 16 is a schematic view of a bottom view of a vehicle body structure illustrating a sixth embodiment of the present invention.
Figure 17:
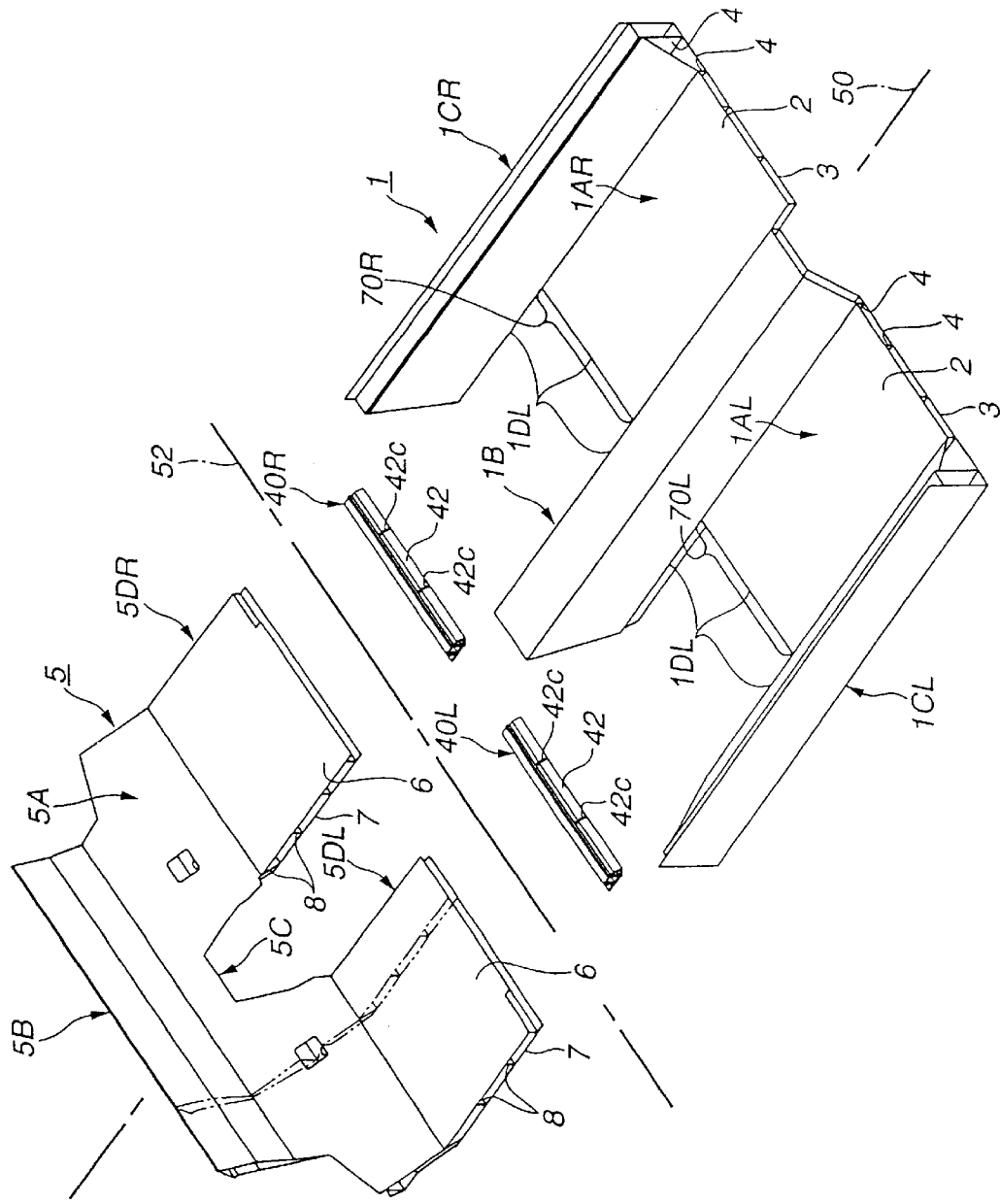
FIG. 17 is an exploded view of a vehicle body structure illustrating a seventh embodiment of the present invention.

A sixth embodiment of the invention will now be described with reference to FIG. 16. This sixth embodiment is substantially the same as the third embodiment shown in FIG. 12 except the use of a plurality of reinforcement bars 20 as shown in FIGS. 15(A) and 15(B). The sixth embodiment also differs from the previous five embodiments in the use of teeth and recesses having a curved periphery (only one of the tooth-recess combinations is shown). Another difference resides in the use of teeth and the recesses having curved periphery.

Each reinforcement bar 20 has a flexural rigidity that decreases as a distance from the dash cross member 5 increases. In this example, each reinforcement bar 20 has a cross-sectional profile that ranges from an elliptical profile as shown in FIG. 15(A) to a ring fragment-like cross sectional profile as shown in FIG. 15(B), both of which are formed using vertical compression. The cross-sectional area is constant over the entire length of each reinforcement bar 20. At its forward end, the reinforcement bar 20 has the cross-sectional profile as shown in FIG. 15(A). At its rear end, the reinforcement bar 20 has the cross sectional profile as shown in FIG. 15(B).

A seventh embodiment of the invention will now be described with reference to FIGS. 17 to 24. Comparing FIG. 17 with FIG. 4 will reveal that the seventh embodiment is substantially the same as the first embodiment. However, the seventh embodiment is different from the first embodiment in the manner of joining the first and second teeth 5DL and 5DR of the dash cross member 5 with the forward edges 70L, 70R of the left-hand and right-hand floor panels 1AL, 1AR.

A first joint 40L is used to connect the first tooth 5DL to the left-hand floor panel 1AL and a second joint 40R is used to connect the second tooth 5DR to the right-hand floor panel 1AR prior to welding. In this embodiment, the first and second joints 40L, 40R are identical.

Figure 18:
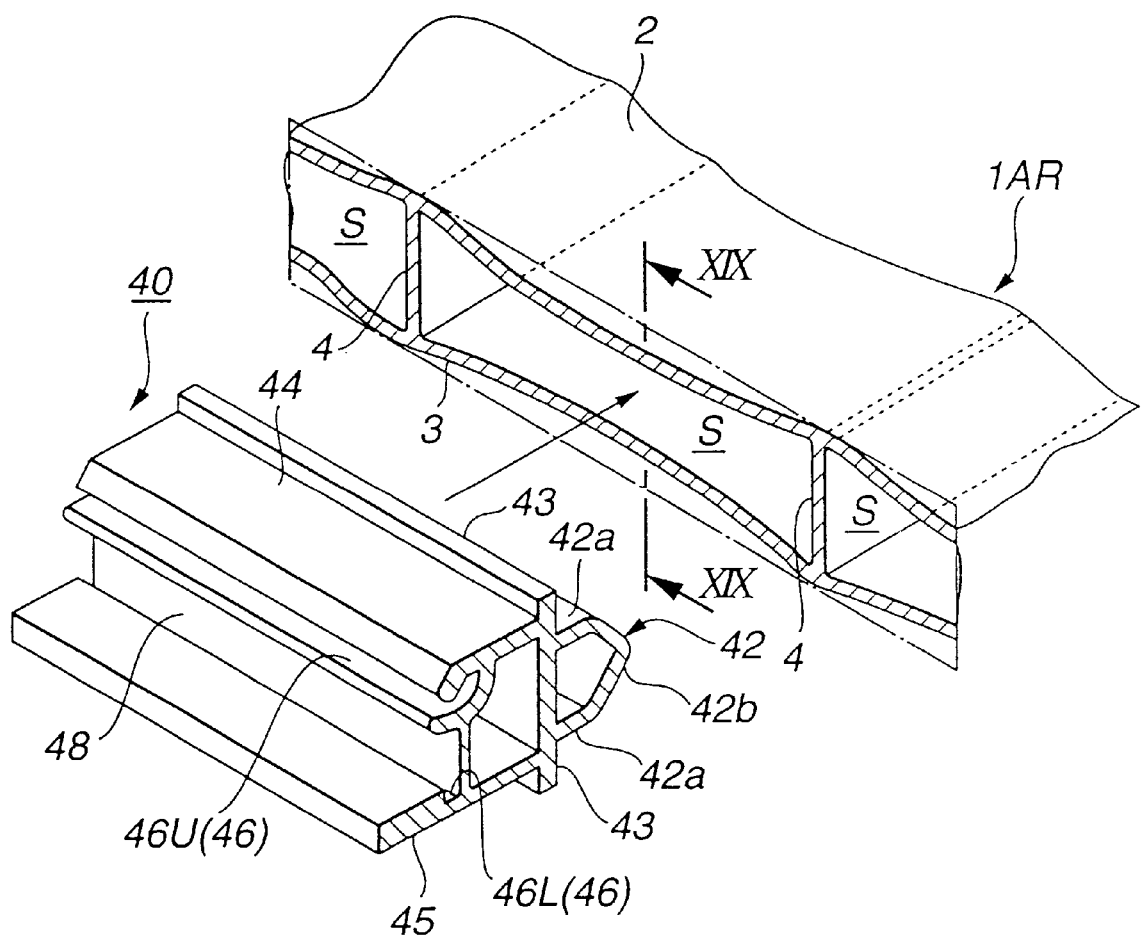
FIG. 18 is an exploded view showing a portion of a joint and a portion of a floor panel portion of a floor.
Figure 21:
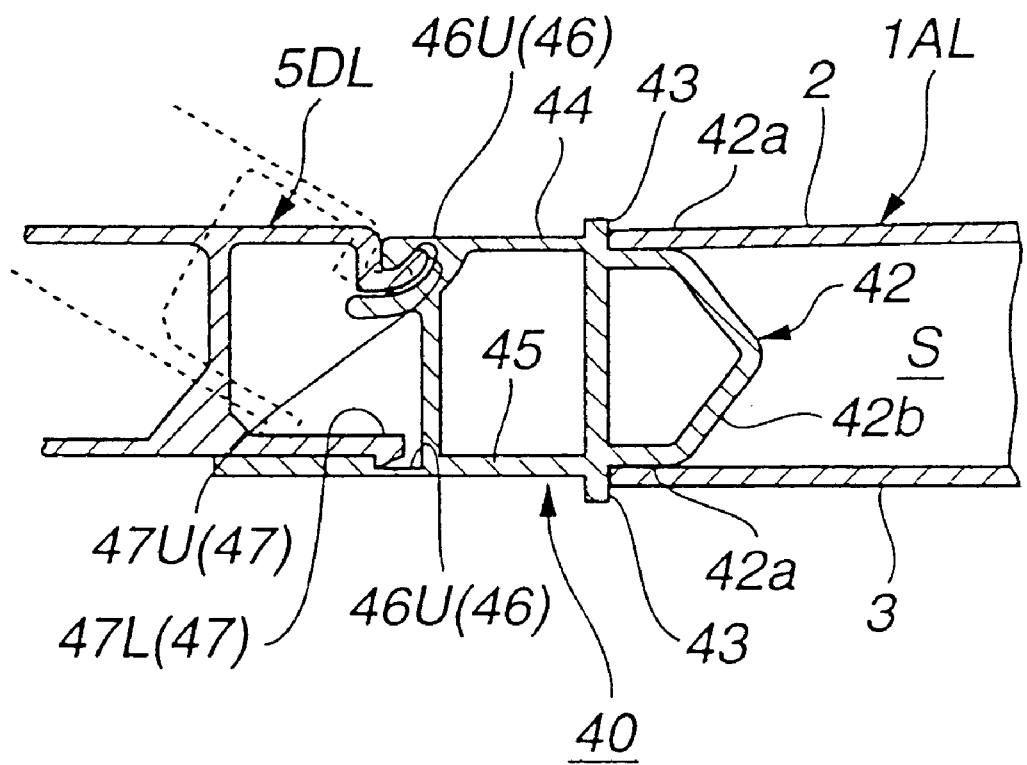
FIG. 21 is a section similar to that of FIG. 16 showing a cross member held in a predetermined position with respect to the joint.

As best seen in FIG. 18, each of the first and second joints 40L, 40R is an extruded part constructed from a light metal, such as an aluminum alloy. The first and second joints 40L, 40R are extruded in the same direction as the dash cross member 5. As best seen in FIG. 21, each joint 40L, 40R has a coupling half 16 and an insert 42. Each of the teeth 5DL and 5DR of the dash cross member 5 has a coupling half 47 that is adapted to be in locking engagement with the coupling half 46 of the respective mating joint 40.

Figure 22:
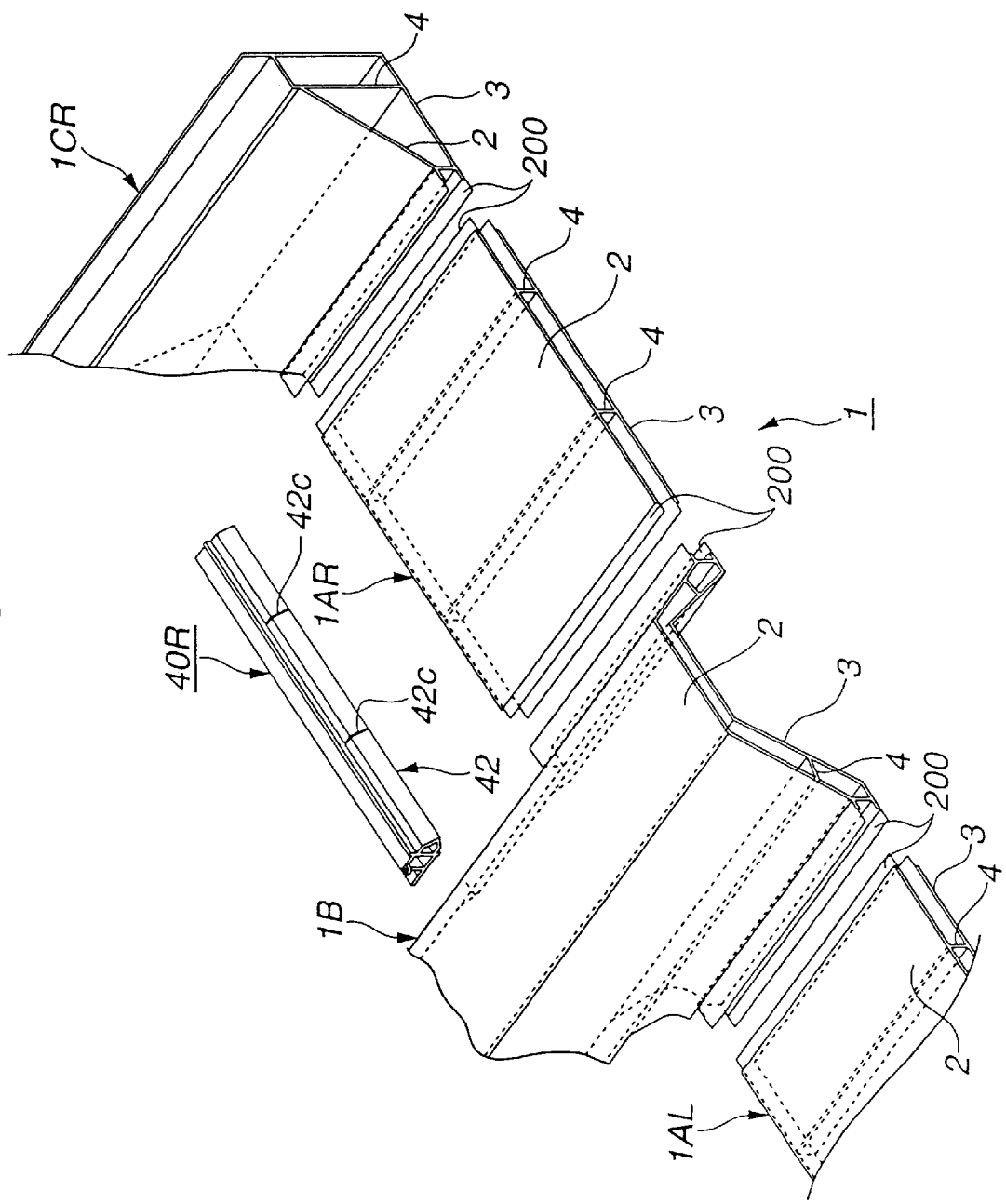
FIG. 22 is an exploded view of a floor with a joint illustrating an eighth embodiment of the present invention.
Figure 23:
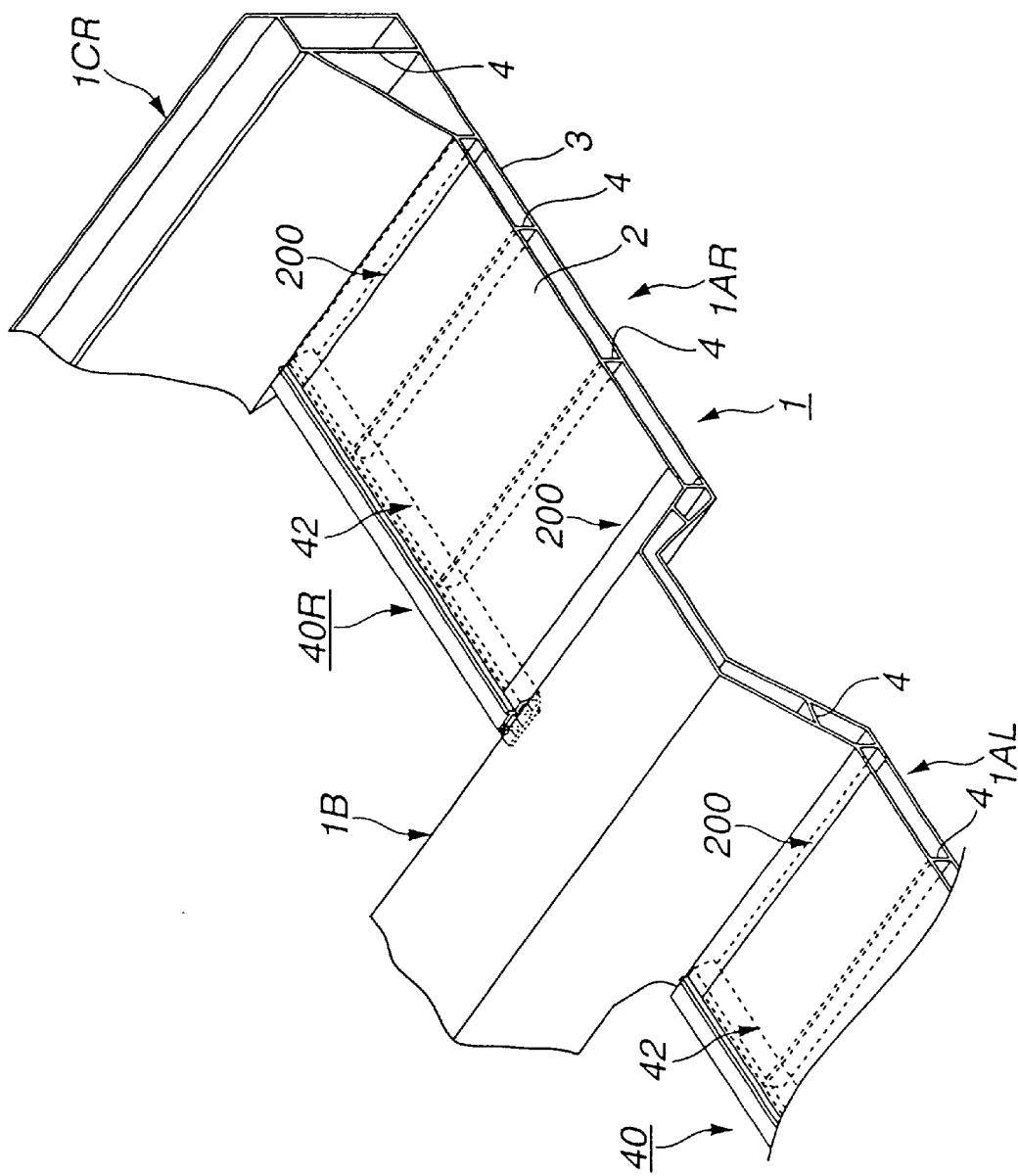
FIG. 23 is a fragmentary perspective view of the floor with joints inserted into the floor panel portions.

Referring to FIGS. 22 and 23, each floor panel 1AL, 1AR is connected to the tunnel 1B and its respective side sill 1CL, 1CR using couplings 200.

Figure 19:
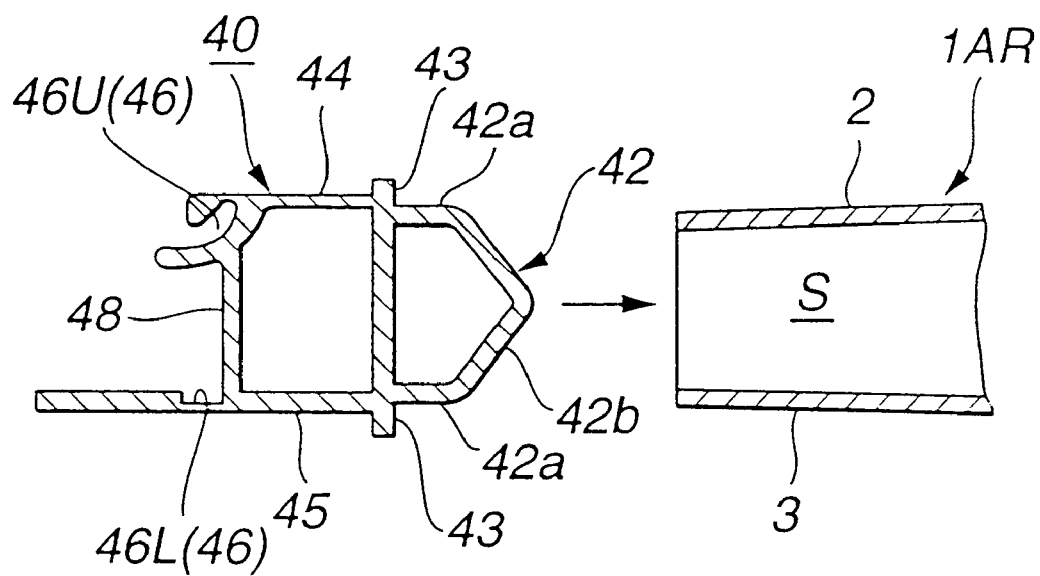
FIG. 19 is section taken through the line XIX—XIX in FIG. 18.
Figure 20:
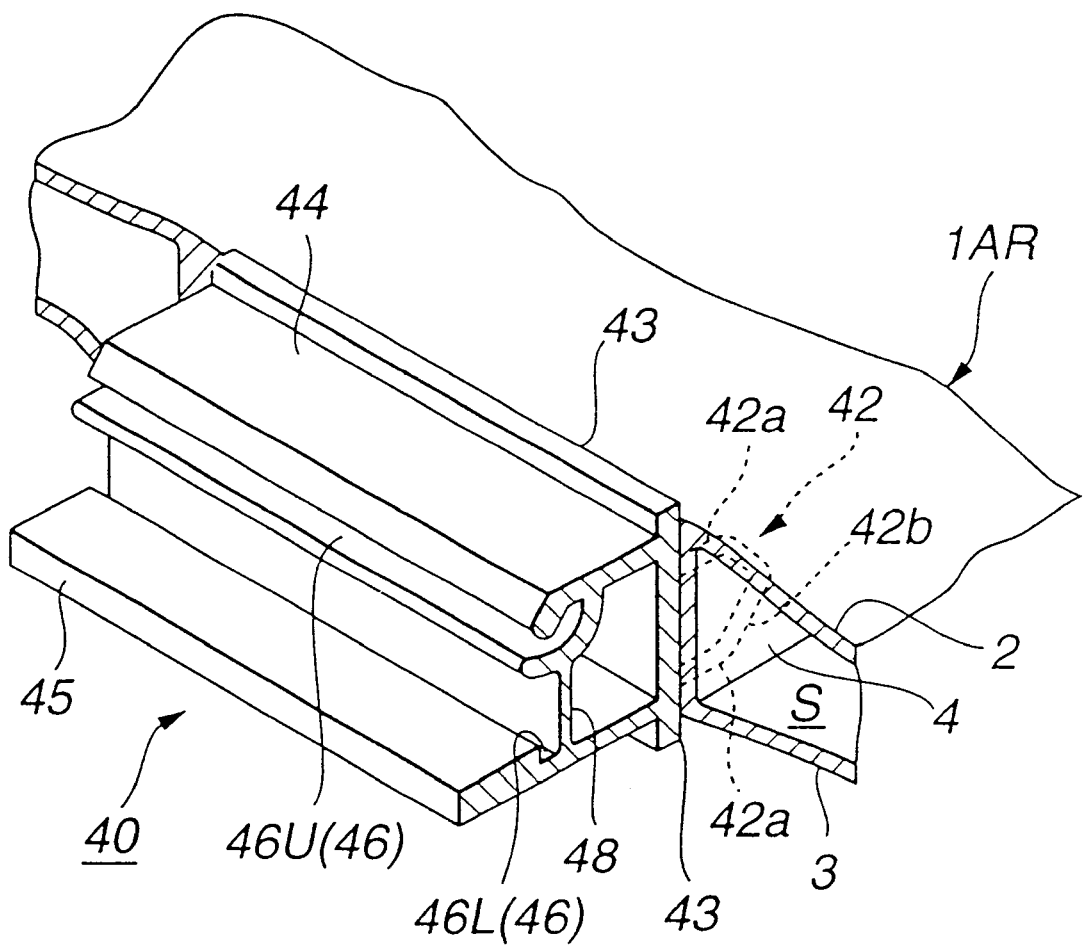
FIG. 20 is a fragmentary perspective view showing the joint inserted into the floor panel portion of the floor.

As shown in FIGS. 19–21, the joints 40L, 40R are inserted into channels S of the floor panels 1AL, 1AR, thereby resulting in the assembly as shown in FIG. 23.

More specifically, as mentioned above, each of the floor panels 1AL, 1AR has a plurality of channels S, which are formed during the extrusion process, that are separated by partitions 4. These channels S are open at forward edges 70L, 70R of the floor panels 1AL, 1AR.

Each of the joints 40L, 40R has an insert 42. Each insert 42 is inserted into the extrusion channels S of the floor panels 1AL, 1AR, which prevents the floor panels 1AL, 1AR, from warping when welded. Because the floor panels 1AL, 1AC have extrusion channels S that are separated by reinforcement walls 4, the insert 42 is divided by spaced slits 42C into segments.

Each insert 42 has two parallel spaced walls 42a that are interconnected by a tapered projection 42b. The distance between the two spaced walls 42a is substantially the same as the distance between the two spaced walls 2 and 3 that define the corresponding channel S. To control or limit the amount that the projection 42 is inserted into the channel S, each joint has a stop 43 that extends substantially vertically and that abuts the spaced walls 2 and 3 of the floor panels 1AL, 1AR. Each of the parallel spaced walls 42a of the projection 42 extend from the stop 43 at a substantially right angle. The stop 43 is spaced from another vertical wall 48. The stop 43 and the vertical wall 48 are interconnected by two spaced horizontal and substantially parallel upper and lower walls 44 and 45. The upper and lower horizontal wall 44 and 45 extend in parallel from the vertical wall on which the stop 43 is formed, but the lower wall 45 extends further than the upper wall 44 does. The lower wall 45 extends beyond the vertical wall 48.

Once the projection 42 is inserted into the respective channels S of the floor panel portion 1AL or 1AR, an appropriate welding technique, such as laser welding or MIG welding, is used to weld the joint 40L or 40R to the respective floor panel portion 1AL or 1AR.

As best seen in FIGS. 18 and 19, the coupling half 45 of each joint 40L, 40R has a cavity 46U. As best seen in FIG. 21, the coupling half 47 of each tooth 5DL and 5DR has a projection 47U that is inserted into the cavity 46U. The cavity 46U and the respective projection 47U serve as a center about which the dash cross member 5 can pivot toward a predetermined position relative to the floor panel portions 1AL and 1AR of the floor 1. The coupling half 46 of each joint 40 has a latch receiving cavity 46L. As best seen in FIG. 21, the coupling half 47 of each tooth 5DL or 5DR has a latch 47L that is fitted, by snap action, into the latch receiving cavity 46U, to hold the dash cross member 5 in the predetermined position.

Figure 24:
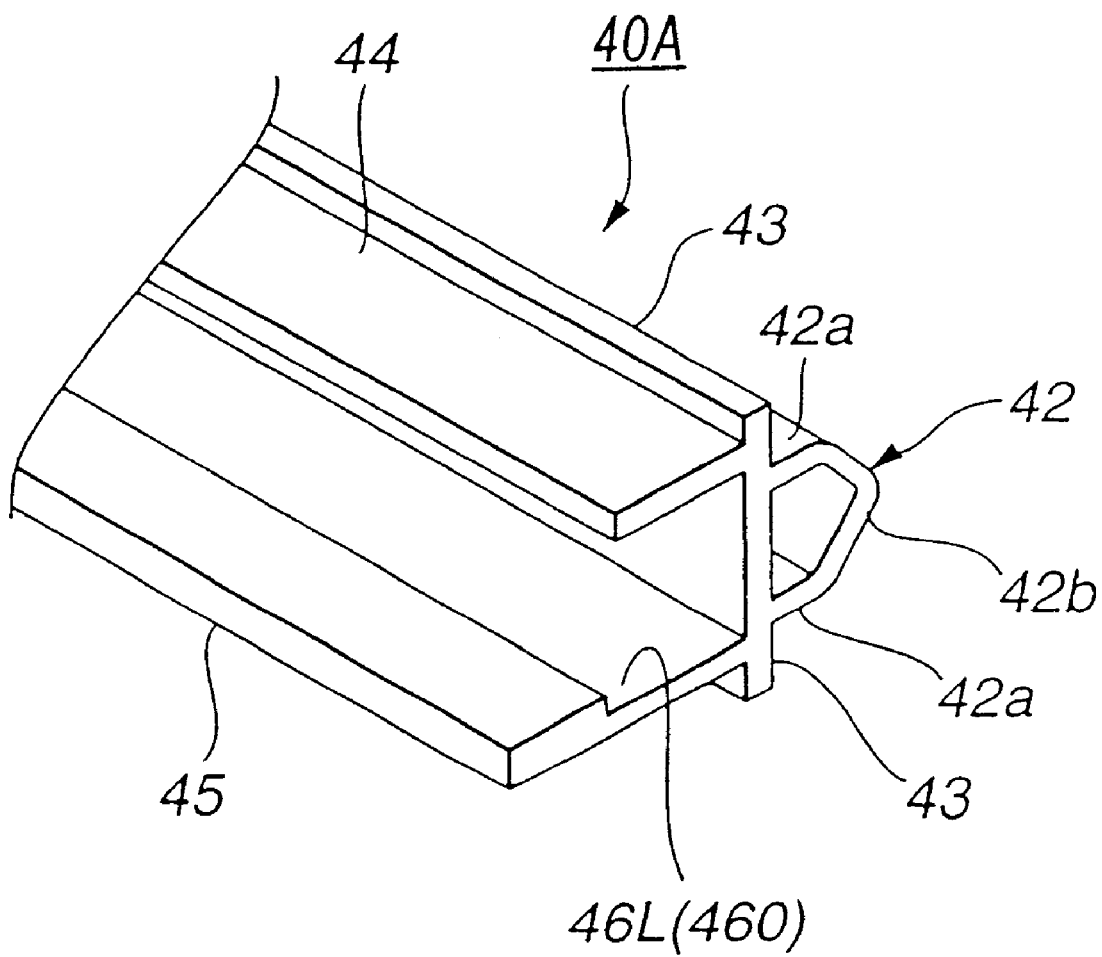
FIG. 24 is a fragmentary perspective view of a modification of a joint.

A modified joint 40A is shown in FIG. 24. In this modified joint 40A, there is no cavity 46U. The coupling half 46O still has the latch receiving cavity 46L.

Although the invention has been described with reference to only a limited number of embodiments, the scope of invention is not limited thereto. That is to say, various modifications and variations of the embodiments described above will be evident to those skilled in the art after reading the above.

The contents of disclosure of Japanese Patent Applications No. 11-297413, filed Oct. 19, 1999, and No. 11-297438, filed Oct. 19, 1999, are hereby incorporated by reference in their entireties.

What is claimed is:

1. A vehicle body structure for a vehicle having a longitudinal center line and a transverse line that crosses the longitudinal center line, the body structure comprising:
    an extruded cross member having at least one tooth; and
    an extruded floor including:
        a plurality of structural members having ends contacting the cross member; and
        at least one floor panel portion disposed between adjacent ones of the plurality of structural members and having an edge at least partially recessed from the ends of the structural members to form a recess that receives one of the at least one tooth.

2. A vehicle body structure as claimed in claim 1, wherein the plurality of structural members comprises a tunnel and a side sill spaced from the tunnel along the transverse line.

3. A vehicle body structure as claimed in claim 2, wherein the plurality of structural members further comprises another side sill spaced from the tunnel along the transverse line opposite the side sill.

4. A vehicle body structure as claimed in claim 3, wherein the cross member comprises a vertical wall section and a toe board section extending at an angle from the vertical wall section.

5. A vehicle body structure as claimed in claim 4, wherein each of the at least one tooth and the toe board section are a monolithic piece.

6. A vehicle body structure as claimed in claim 5, wherein the at least one tooth has a uniform cross section along the transverse line.

7. A vehicle body structure as claimed in claim 6, wherein each recess and each of the at least one tooth are rectangular.

8. A vehicle body structure as claimed in claim 6, wherein each recess and each at least one tooth are substantially triangular in shape.

9. A vehicle body structure as claimed in claim 6, wherein a stress discontinuity arising during an impact is substantially zero.

10. A vehicle body structure as claimed in claim 3, further comprising two side members connected substantially in parallel to the cross member.

11. A vehicle body structure as claimed in claim 6, further comprising a plurality of reinforcement members connected at a first end to the toe board section and at a second end to one of the at least one floor panel.

12. A vehicle body structure as claimed in claim 11, wherein each of the plurality of reinforcement members has a flexural rigidity that decreases from the toe board section to the at least one floor panel portion.

13. A vehicle body structure as claimed in claim 11, wherein each of the plurality of reinforcement members has a substantially uniform cross-sectional area and a cross-sectional profile that is substantially elliptical at one end and arcuate-shaped at an opposite end.

14. A vehicle body structure as claimed in claim 6, further comprising:
    a first group of reinforcement members lying substantially parallel to the longitudinal center line and being connected at one end to the toe board section and at an opposite end to the one of the at least one floor panel disposed between the tunnel and the side sill; and
    a second group of reinforcement members lying substantially parallel to the longitudinal center line and being connected at one end to the toe board section and at an opposite end to another of the at least one floor panel disposed between the tunnel and the another side sill,
    wherein each reinforcement member of the first and second group has a cross-sectional area that decreases from the toe board section to its respective floor panel.

15. A vehicle body structure as claimed in claim 14, further comprising:
    a first beam lying substantially parallel to the transverse line and interconnecting the first group of reinforcement members; and
    a second beam lying substantially parallel to the transverse line and interconnecting the second group of reinforcement members.

16. A vehicle body structure as claimed in claim 3, further comprising:
- a first joint connecting one of the at least one tooth to one of the at least one floor panel disposed between the tunnel and the side sill and having a coupling portion and projecting portions; and
- a second joint connecting another one of the at least one tooth to another one of the at least one floor panel disposed between the tunnel and the another side sill and having a coupling portion and projecting portions,
- wherein the one of the at least one floor panel has a plurality of channel extending substantially parallel to the longitudinal center line and receiving the projecting portions of the first joint,
- wherein the another of the at least one floor panel has a plurality of channels extending substantially parallel to the longitudinal center line and receiving the projecting portion s of the second joint,
- wherein each of the at least one tooth has a connecting, portion that interlocks with the coupling, portion of the respective first and second joint.

17. A vehicle body structure as claimed in claim 16, wherein the projecting portions of the first and second joints each have a substantially horizontal upper wall, a substantially horizontal lower wall, and a connecting wall connecting the upper wall and the lower wall.

18. A vehicle body as claimed in claim 17, wherein the projecting portions have a vertical wall height and each of the channels of the one and the another floor panel has a vertical channel height that is substantially equal to the vertical wall height of the projecting portions.

19. A vehicle body as claimed in claim 16, wherein each of the first and second joints has a stop that abuttingly engages the edge of the one and the another one of the at least one floor panel.

20. A vehicle body as claimed in claim 16, wherein the coupling portion of the first joint has a cavity and the one of the at least one tooth has a connecting projection inserted into the coupling portion of the first joint, and the coupling portion of the second joint has a cavity and the another one of the at least one tooth has a connecting projection inserted into the coupling portion of the second joint.

21. A vehicle body as claimed in claim 20, wherein the cavity of the first joint is a rotational center about which the one of the tooth rotates with respect to the first joint and the cavity of the second joint is a rotational center about which the another one of the tooth rotates with respect to the second joint.

22. A vehicle body as claimed in claim 21,
- wherein the one of the at least one tooth has a latch,
- wherein the coupling portion of the first joint has another cavity that receives the latch of the one of the at least one tooth,
- wherein the another of the at least one tooth has a latch, and
- wherein the coupling portion of the second joint has another cavity that receives the latch of the another of the at least one tooth.

23. A vehicle body structure for a vehicle having a center line extending in forward and rearward directions and a transverse line intersecting the center line, comprising:
- an extruded cross member having a tooth and a moment arm center about which a moment arm acts during a front end vehicle collision, wherein the extruded cross member has an upper wall, a lower wall and at least one wall connecting the upper wall and the lower wall of the cross member; and
- an extruded floor engaged with the cross member and receiving the tooth at a joining portion such that the joining portion lies rearward of the moment arm center, wherein the extruded floor has an upper wall, a lower wall and at least one wall extending in the forward and rearward directions and connecting the upper wall and the lower wall of the floor.

24. A vehicle body structure for a vehicle having a center line extending in forward and rearward directions and a transverse line intersecting the center line, comprising:
- an extruded cross member having a tooth, wherein the extruded cross member has an upper wall, a lower wall and at least one wall connecting the upper wall and the lower wall of the cross member; and
- an extruded floor engaged with the cross member and receiving the tooth at a joining portion, wherein the extruded floor has an upper wall, a lower wall and at least one wall extending in the forward and rearward directions and connecting the upper wall and the lower wall of the floor, and
- wherein a stress discontinuity in the vicinity of the joining portion is substantially zero.

25. A vehicle body structure for a vehicle having a center line extending in forward and rearward directions and a transverse line intersecting the center line, comprising:
- an extruded cross member having at least one tooth;
- an extruded floor including:
  - a plurality of structural members having forward ends contacting the cross member; and
  - at least one floor panel portion disposed between adjacent ones of the plurality of the structural members and having a forward edge recessed from the forward ends of the structural members to form a recess that receives one of the at least one tooth;
- means for connecting the cross member and the floor.

26. A vehicle body structure as claimed in claim 25, wherein the means for connecting includes a weld.

27. A vehicle body structure as claimed in claim 25, wherein the means for connecting includes a joint that connects each of the at least one tooth to one of the at least one floor panel.

28. A vehicle body structure as claimed in claim 27, wherein the joint includes a coupling portion, projecting portions disposed opposite the coupling portion and a stop that abuttingly engages the at least one floor panel.

29. A vehicle body structure as claimed in claim 28,
- wherein the projecting portions have a substantially horizontal upper wall, a substantially horizontal lower wall, and a connecting wall connecting the upper wall and the lower wall,
- wherein the coupling portion has a cavity that receives a portion of one of the at least one tooth,
- wherein the coupling portion has another cavity that receives another portion of the one of the at least one tooth,
- wherein the cavity is a rotational center about which the one of the tooth rotates with respect to the joint.

30. A vehicle body structure for a vehicle having a center line extending in forward and rearward directions and a transverse line intersecting the center line, comprising:
- an extruded cross member having a first and a second tooth; and
- an extruded floor including:

a plurality of structural members including:
- a tunnel extending substantially along the center line and having a forward end in contact with the cross member;
- a first side sill disposed adjacent to the tunnel in a first direction along the transverse line and having a forward end in contact with the cross member; and
- a second side sill disposed adjacent to the tunnel in a second direction, which is opposite to the first direction and having a forward end in contact with the cross member;
- a first floor panel disposed between the tunnel and the first side sill and having a forward edge at least partially recessed from the forward ends of the tunnel and the first side sill to form a first recess that receives the first tooth; and
- a second floor panel disposed between the tunnel and the second side sill and having a forward edge at least partially recessed from the forward ends of the tunnel and the second side sill to form a second recess that receives the second tooth.

31. A vehicle body structure as claimed in claim 30, wherein the first and second floor panels and the first and second recesses are rectangular.

32. A vehicle body structure as claimed in claim 30, wherein the first and second floor panels and the first and second recesses are substantially triangular in shape.

33. A vehicle body structure as claimed in claim 30, wherein the cross member comprises a vertical wall section and a toe board section extending at an angle from the vertical wall section.

34. A vehicle body structure as claimed in claim 33, wherein the first and second teeth and the toe board section are a monolithic piece.

35. A vehicle body structure as claimed in claim 34, wherein the first and second teeth have uniform cross sections along the transverse line.

36. A vehicle body structure as claimed in claim 35, wherein a stress discontinuity arising during an impact is substantially zero.

37. A vehicle body structure as claimed in claim 30, further comprising two side members connected substantially in parallel to the cross member.

38. A vehicle body structure as claimed in claim 6, further comprising a plurality of reinforcement members connected at a first end to the toe board section and at a second end to one of the at least one floor panel.

39. A vehicle body structure as claimed in claim 38, further comprising:
- a first group of reinforcement members lying substantially parallel to the center line and being connected at one end to the toe board section and at an opposite end to the first one floor panel; and
- a second group of reinforcement members lying substantially parallel to the center line and being connected at one end to the toe board section and at an opposite end to the second floor panel.

40. A vehicle body structure as claimed in claim 39, wherein each of the reinforcement members of the first and second groups has a flexural rigidity that decreases from the toe board section to the respective first or second floor panel.

41. A vehicle body structure as claimed in claim 40, wherein each of the reinforcement members of the first and second groups has a substantially uniform cross-sectional area and a cross-sectional profile that is substantially elliptical at one end and arcuate-shaped at an opposite end.

42. A vehicle body structure as claimed in claim 41, further comprising:
- a first beam lying substantially parallel to the transverse line and interconnecting the first group of reinforcement members; and
- a second beam lying substantially parallel to the transverse line and interconnecting the second group of reinforcement members.

43. A vehicle body as claimed in claim 30, wherein the cross member is a dual layer structure having a plurality of ribs connecting the layers.

44. A vehicle body as claimed in claim 30, wherein the floor is dual layer structure having a plurality of ribs connecting the layers.

45. A vehicle having a center line extending in forward and rearward directions and a transverse line intersecting the center line, the vehicle comprising:
- a front compartment housing the engine and at least partially defined by an extruded cross member and first and second side members connected at one end to the cross member;
- a passenger compartment disposed rearward of the front compartment at least partially defined by the cross member and an extruded floor comprising:
  - a plurality of structural members including:
    - a tunnel extending substantially along the center line and having a forward end in contact with the cross member;
    - a first side sill disposed adjacent to the tunnel in a first direction along the transverse line and having a forward end in contact with the cross member; and
    - a second side sill disposed adjacent to the tunnel in a second direction, which is opposite to the first direction and having a forward end in contact with the cross member;
    - a first floor panel disposed between the tunnel and the first side sill and having a forward edge at least partially recessed from the forward ends of the tunnel and the first side sill to form a first recess that receives the first tooth; and
    - a second floor panel disposed between the tunnel and the second side sill and having a forward edge at least partially recessed from the forward ends of the tunnel and the second side sill to form a second recess that receives the second tooth; and
- a rear compartment disposed rearward of the passenger compartment.

* * * * *